(12) United States Patent
Minato et al.

(10) Patent No.: US 7,948,623 B2
(45) Date of Patent: May 24, 2011

(54) METHOD FOR EVALUATING COLOR FILTER, COLOR FILTER AND LIQUID CRYSTAL DISPLAY DEVICE

(75) Inventors: Koichi Minato, Tokyo (JP); Takeshi Itoi, Tokyo (JP); Sosuke Akao, Tokyo (JP); Hidesato Hagiwara, Tokyo (JP); Masayuki Yamamoto, Tokyo (JP); Yuki Saito, Tokyo (JP)

(73) Assignees: Toppan Printing Co., Ltd., Tokyo (JP); Tokyo Ink Mfg. Co., Ltd., Tokyo (JP)

( * ) Notice: Subject to any disclaimer, the term of this patent is extended or adjusted under 35 U.S.C. 154(b) by 99 days.

(21) Appl. No.: 12/457,701

(22) Filed: Jun. 18, 2009

(65) Prior Publication Data

US 2009/0257007 A1 Oct. 15, 2009

Related U.S. Application Data

(63) Continuation of application No. PCT/JP2007/074227, filed on Dec. 17, 2007.

(30) Foreign Application Priority Data

Dec. 19, 2006 (JP) ................................. 2006-341842

(51) Int. Cl.
*G01J 4/00* (2006.01)
(52) U.S. Cl. ............................. 356/365; 349/96; 349/61
(58) Field of Classification Search .......... 356/364–369; 349/61, 96
See application file for complete search history.

(56) References Cited

U.S. PATENT DOCUMENTS

| | | | | |
|---|---|---|---|---|
| 7,713,613 B2* | 5/2010 | Shinohara | ...................... | 428/220 |
| 7,763,672 B2* | 7/2010 | Yamamoto et al. | ........... | 523/220 |
| 7,812,901 B2* | 10/2010 | Kinjo et al. | ...................... | 349/96 |
| 7,852,441 B2* | 12/2010 | Yano et al. | ...................... | 349/122 |
| 2009/0167999 A1* | 7/2009 | Ohmori et al. | ................. | 349/117 |
| 2009/0231519 A1* | 9/2009 | Toyama et al. | ................ | 349/96 |
| 2009/0279030 A1* | 11/2009 | Toyama et al. | ............... | 349/117 |
| 2010/0141873 A1* | 6/2010 | Kinjo et al. | ..................... | 349/96 |

FOREIGN PATENT DOCUMENTS

| | | |
|---|---|---|
| JP | 10-153802 | 6/1998 |
| JP | 2000-136253 | 5/2000 |
| JP | 2000-187114 | 7/2000 |
| JP | 2001-166127 | 6/2001 |
| JP | 2002-114907 | 4/2002 |
| JP | 2005-148118 | 6/2005 |

OTHER PUBLICATIONS

English Translation of the International Preliminary Report on Patentability mailed Jul. 2, 2009 in corresponding International Patent Application PCT/JP2007/074227.
Japanese Office Action issued Mar. 22, 2011 in corresponding Japanese Patent Application 2006-341842.

* cited by examiner

*Primary Examiner* — L. G Lauchman

(57) ABSTRACT

A method of evaluating a color filter including a substrate, and at least three color pixels disposed thereon, the method includes determining an oblique visibility of a liquid crystal display device equipped with the color filter on the basis of value $\xi_1$ obtained from the equation (1):

$$\xi_1 = \int_a^b \Delta(\lambda) \cdot T(\lambda) d\lambda \qquad (1)$$

wherein "a" and "b" are values respectively representing a wavelength range of a continuous wavelength light and satisfying conditions of $380 \leq a$, $b \leq 780$ and $a<b$; $\Delta(\lambda)$ represents an optical retardation obtained by irradiating each of color pixels with a continuous wavelength light containing light components with wavelength $\lambda$ falling within a range of 380 nm to 780 nm at an incident angle, and subjecting the transmitted light to measurement using a spectroscopic ellipsometer, and $T(\lambda)$ represents a spectral transmittance of the color pixels measured at the wavelength $\lambda$ falling within a range of 380 nm-780 nm.

10 Claims, 1 Drawing Sheet

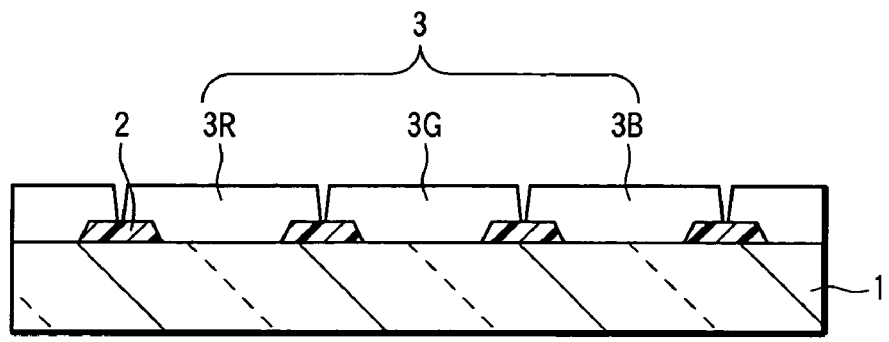
F I G. 1
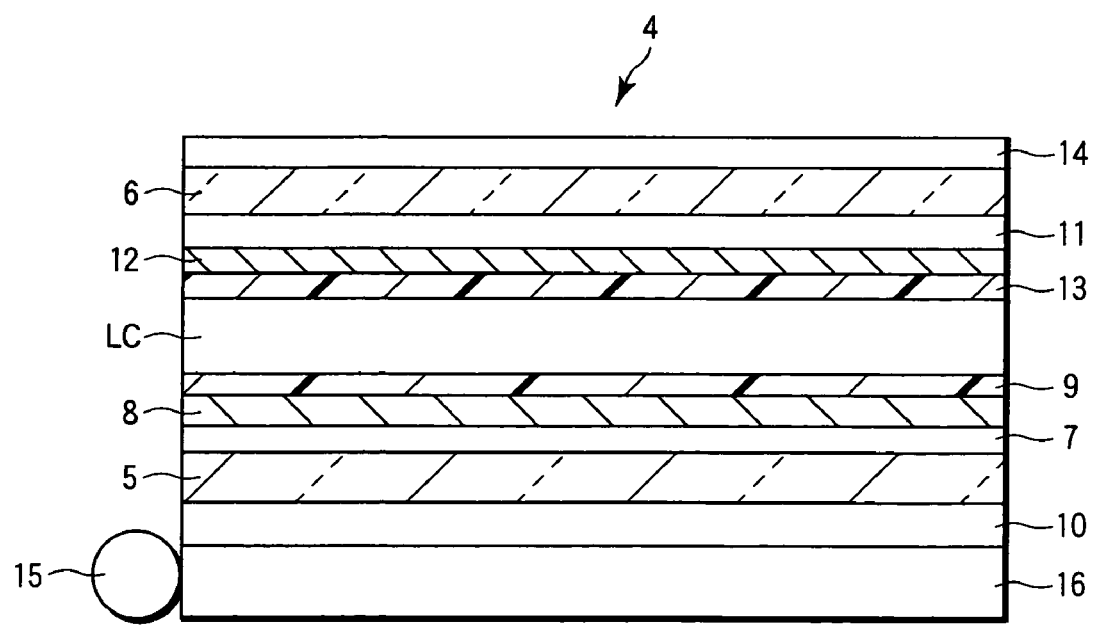
F I G. 2

METHOD FOR EVALUATING COLOR FILTER, COLOR FILTER AND LIQUID CRYSTAL DISPLAY DEVICE

CROSS-REFERENCE TO RELATED APPLICATIONS

This is a Continuation Application of PCT Application No. PCT/JP2007/074227, filed Dec. 17, 2007, which was published under PCT Article 21(2) in Japanese.

This application is based upon and claims the benefit of priority from prior Japanese Patent Application No. 2006-341842, filed Dec. 19, 2006, the entire contents of which are incorporated herein by reference.

BACKGROUND OF THE INVENTION

1. Field of the Invention

This invention relates to a method of evaluating a color filter to be employed in a liquid crystal device, a solid-state image pickup device, etc., and also relates to a color filter evaluated by the method and to a liquid crystal display device which is provided with such a color filter.

2. Description of the Related Art

Recently, because of advantages such as space-saving, lightweight properties, power-saving, etc., due to slimming-down of a device, a liquid crystal display device is now rapidly propagated especially as a display device for a television. In order to make the liquid crystal display device applicable to a television, it is required to further enhance various properties such as a brightness, contrast and omnidirectional visibility, therefore the display device is now frequently constructed such that an optical retardation control layer is employed in combination with a linear deflecting plate.

In recent years in particular, in the case of a vertical alignment mode liquid crystal display which is capable of exhibiting a display of high contrast, there has been employed an optical retardation film exhibiting negative birefringence anisotropy with the optical axis thereof being perpendicular to the substrate thereof (or negative C plate) together with an optical retardation film exhibiting positive birefringence anisotropy with the optical axis thereof being horizontal to the substrate thereof (or positive A plate) (for example, see JP-A 10-153802).

In order to realize such an optical retardation control as described above, there have been generally employed an optical retardation control film that can be obtained by stretching an polycarbonate film or that can be obtained by coating a liquid crystal material exhibiting birefringence anisotropy on the surface of a triacetyl cellulose film, etc.

However, since the retardation of the aforementioned optical retardation film is uniformly retained in-plane and hence the retardation is not optimally set for each of pixels to be actually displayed, it cannot necessarily be said that compensation of the optical retardation is optimally executed by the optical retardation film.

One of the reasons is that since the optical retardation and refractive index of liquid crystal material themselves are dependent on the wavelength of transmitted light, the retardation demanded for the optical retardation film may differ depending on the color of each pixel constituting the color filter (actually, on the wavelength of transmitted light). In view of this, it has been proposed to control the retardation in conformity with the wavelength of transmitted light, thereby making it possible to optimize the compensation of optical retardation (see, for example, JP-A 2005-148118).

Another reason is that when each of color pixels constituting the color filter has in itself a perpendicular (thicknesswise) optical retardation, an optical retardation is caused to generate in transmitted light, so that the viewing angle dependency of a liquid crystal display device becomes larger, thereby deteriorating the display characteristics thereof. In view of this, it is proposed to construct the colored layer constituting the color filter in a manner to contain a polymer having a planar structure group on its side chain or in a manner to contain birefringent-reducing particles having a birefringence index which is opposite in sign (positive or negative), thereby trying to reduce the retardation of the color filter (see, for example, JP-A 2000-136253).

As a matter of fact, however, in spite of these attempts, there is a problem that when dark display in off state to which viewing angle compensation has been applied is observed obliquely, the dark display appears colored into reddish purple due to the leakage light of red color and blue color.

As a result of studies made by the present inventors on the cause of this problem, it has been found out that the perpendicular optical retardation of each of red, green and blue pixels constituting the color filter differs from each other and that, in the case of the color filter to be manufactured by making use of a pigment dispersed color composition, a green pixel is enabled to exhibit a large negative retardation as compared with the retardation of red and blue pixels, thereby raising the aforementioned problem.

Since the retardation of a color filter is relatively small as compared with that of other components to be employed in a liquid crystal display device, the aforementioned problem was not considered seriously up to date. However, since the optical designing is now generally performed centering around the green color, if the retardation of green pixel differs greatly from that of red and blue pixels, leakage light is caused to generate, thus raising problems with respect to the view angle visibility of the display device.

Generally, the perpendicular optical retardation of each of color pixels of red, green and blue colors constituting the color filter can be measured by making use of an ellipsometer or a phase shift-measuring apparatus. It has been considered difficult, however, in the employment of the conventional technique, to precisely measure the perpendicular optical retardation by making use of a specific wavelength due to the facts that the thickness of the color pixel formed on a substrate falls in most cases is within the range of 1 μm to 3 μm and that the refractive index of the color pixel falls in most cases within the range of 1.55 to 1.8, thereby enabling the influence of interference due to a difference in refractive index between the color pixel and the air layer or the substrate to be included in the phase shift Δ obtained, i.e. the value measured.

With respect to the view angle visibility especially from an oblique angle, since it may be influenced also by the balance of transmissivity of each of red, green and blue pixels constituting the color filter, it has been considered difficult to discuss the visibility simply on the standpoint of how to control the perpendicular optical retardation.

BRIEF SUMMARY OF THE INVENTION

A first object of the present invention is to provide a method for evaluating a color filter, which makes it possible to conveniently and precisely determine the visibility in the oblique direction of a liquid crystal display device equipped with a color filter.

A second object of the present invention is to provide a color filter which is used in combination with an optical retardation film and other constituent members, thereby making it possible to obtain a liquid crystal display device which is excellent in the visibility in the oblique direction on displaying the dark color in field-off state.

A third object of the present invention is to provide a liquid crystal display device which is equipped with the aforementioned color filter and has excellent visibility in the oblique viewing angle on displaying dark color in off state.

According to a first aspect of the present invention, there is provided a method of evaluating a color filter comprising a substrate, and at least three color pixels disposed thereon, the method comprising: determining an oblique visibility of a liquid crystal display device equipped with the color filter on the basis of value $\xi_1$ obtained from equation (1):

$$\xi_1 = \int_a^b \Delta(\lambda) \cdot T(\lambda) d\lambda \qquad (1)$$

wherein "a" and "b" are values respectively representing a wavelength range of a continuous wavelength light and satisfying conditions of: $380 \leq a$, $b \leq 780$ and $a < b$; $\Delta(\lambda)$ represents an optical retardation obtained by irradiating each of the color pixels with a continuous wavelength light containing light components with wavelength $\lambda$ falling within a range of 380 nm to 780 nm at an incident angle, and subjecting the transmitted light to measurement using a spectroscopic ellipsometer; and $T(\lambda)$ represents a spectral transmittance of the color pixels measured at the wavelength $\lambda$ falling within a range of 380 nm-780 nm.

According to a second aspect of the present invention, there is provided a method of evaluating a color filter comprising a substrate, and at least three color pixels disposed thereon, the method comprising: determining an oblique visibility of a liquid crystal display device equipped with the color filter on the basis of value $\xi_2$ obtained from the equation (2):

$$\xi_2 = \int_a^b \Delta(\lambda) \cdot T(\lambda) \cdot S(\lambda) d\lambda \qquad (2)$$

wherein "a" and "b" are values respectively representing a wavelength range of a continuous wavelength light and satisfying conditions of: $380 \leq a$, $b \leq 780$ and $a < b$; $\Delta(\lambda)$ represents an optical retardation obtained by irradiating each of the color pixels with a continuous wavelength light containing light components with wavelength $\lambda$ falling within a range of 380 nm to 780 nm at an incident angle, and subjecting the transmitted light to measurement using a spectroscopic ellipsometer; $T(\lambda)$ represents a spectral transmittance of the color pixels measured at the wavelength $\lambda$ falling within a range of 380 nm-780 nm; and $S(\lambda)$ represents a spectral radiance, at the wavelength $\lambda$, of a light source of the liquid crystal display device.

According to a third aspect of the present invention, there is provided a color filter which comprises a substrate, and at least a red pixel, a green pixel and a blue pixel disposed thereon, and satisfy following equations (3) and (4):

$$100 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_G \cdot T(\lambda)_G d\lambda - \int_a^b \Delta(\lambda)_B \cdot T(\lambda)_B d\lambda| \geq 0 \qquad (3)$$

$$50 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_R \cdot T(\lambda)_R d\lambda - \int_a^b \Delta(\lambda)_G \cdot T(\lambda)_G d\lambda| \geq 0 \qquad (4)$$

wherein "a" and "b" are values respectively representing a wavelength range of a continuous wavelength light and satisfying conditions of: $380 \leq a$, $b \leq 780$ and $a < b$; $\Delta(\lambda)_R$, $\Delta(\lambda)_G$ and $\Delta(\lambda)_B$ represent optical retardations of the red pixel, green pixel and blue pixel, respectively, which are obtained by irradiating each of the pixels with a continuous wavelength light with wavelength $\lambda$ falling within a range of 380 nm to 780 nm at an incident angle, and subjecting the transmitted light to measurement using a spectroscopic ellipsometer; and $T(\lambda)_R$, $T(\lambda)_G$ and $T(\lambda)_B$ represent spectral transmittances of the red pixel, green pixel and blue pixel, respectively, which are measured at the wavelength $\lambda$ falling within a range of 380 nm-780 nm.

According to a fourth aspect of the present invention, there is provided a color filter which comprises a substrate, and at least a red pixel, a green pixel and a blue pixel disposed thereon, and satisfy following equations (5) and (6):

$$50 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_G \cdot T(\lambda)_G \cdot S(\lambda) d\lambda - \int_a^b \Delta(\lambda)_B \cdot T(\lambda)_B \cdot S(\lambda) d\lambda| \geq 0 \qquad (5)$$

$$25 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_R \cdot T(\lambda)_R \cdot S(\lambda) d\lambda - \int_a^b \Delta(\lambda)_G \cdot T(\lambda)_G \cdot S(\lambda) d\lambda| \geq 0 \qquad (6)$$

wherein "a" and "b" are values respectively representing a wavelength range of a continuous wavelength light and satisfying conditions of: $380 \leq a$, $b \leq 780$ and $a < b$; $\Delta(\lambda)_R$, $\Delta(\lambda)_G$ and $\Delta(\lambda)_B$ represent optical retardations of the red pixel, green pixel and blue pixel, respectively, which are obtained by irradiating each of the pixels with a continuous wavelength light containing light components with wavelength $\lambda$ falling within a range of 380 nm to 780 nm to at an incident angle, and subjecting the transmitted light to measurement using a spectroscopic ellipsometer; $T(\lambda)_R$, $T(\lambda)_G$ and $T(\lambda)_B$ represent spectral transmittances of the red pixel, green pixel and blue pixel, respectively, which are measured at the wavelength $\lambda$ falling within a range of 380 nm-780 nm; and $S(\lambda)$ representing a spectral radiance, at the wavelength $\lambda$, of a light source of the liquid crystal display device.

According to a fifth aspect of the present invention, there is provided a liquid crystal display device which is equipped with any one of the aforementioned color filters.

BRIEF DESCRIPTION OF THE SEVERAL VIEWS OF THE DRAWING

FIG. 1 is a cross-sectional view schematically illustrating a color filter according to one embodiment of the present invention; and FIG. 2 is a cross-sectional view schematically illustrating a liquid crystal display device equipped with a color filter of the present invention.

DETAILED DESCRIPTION OF THE INVENTION

There will now be explained specific embodiments of the present invention.

FIG. 1 is a color filter according to a first embodiment of the present invention. In FIG. 1, the color filter is provided with a glass substrate 1 on which a black matrix 2 acting as a light-shielding layer, and color pixels 3 are disposed. The color pixels 3 are constituted by a red pixel 3R, a green pixel 3G and a blue pixel 3B.

The values $\xi_1$ or $\xi_2$ represented by the following equations (1) and (2), respectively and related to a perpendicular optical retardation are selected to satisfy the following equations (3) and (4) or equations (5) and (6).

$$\xi_1 = \int_a^b \Delta(\lambda) \cdot T(\lambda) d\lambda \qquad (1)$$

wherein $\Delta(\lambda)$ represents an optical retardation obtained by irradiating each of these color pixels with a continuous wavelength light containing light components with wavelength $\lambda$ falling within a range of 380 nm to 780 nm at an incident angle, and subjecting the transmitted light to measurement using a spectroscopic ellipsometer; and $T(\lambda)$ represents a spectral transmittance of the color pixels measured at the wavelength λ falling within a range of 380 nm-780 nm.

$$\xi_2 = \int_a^b \Delta(\lambda) \cdot T(\lambda) \cdot s(\lambda) d\lambda \quad (2)$$

wherein Δ(λ) represents an optical retardation obtained by irradiating each of these color pixels with a continuous wavelength light containing light components with wavelength λ falling within a range of 380 nm to 780 nm at an incident angle, and subjecting the transmitted light to measurement using a spectroscopic ellipsometer; T(λ) represents a spectral transmittance of the color pixels measured at the wavelength λ falling within a range of 380 nm-780 nm, and S(λ) represents a spectral radiance, at the wavelength λ, of a light source to be used in a liquid crystal display device.

$$100 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_G \cdot T(\lambda)_G d\lambda - \int_a^b \Delta(\lambda)_B \cdot T(\lambda)_B d\lambda| \geq 0 \quad (3)$$

$$50 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_R \cdot T(\lambda)_R d\lambda - \int_a^b \Delta(\lambda)_G \cdot T(\lambda)_G d\lambda| \geq 0 \quad (4)$$

In equations (3) and (4), $\Delta(\lambda)_R$, $\Delta(\lambda)_G$, and $\Delta(\lambda)_B$ represent an optical retardation of the red pixel, of the green pixel and of the blue pixel, respectively, all of which are obtained by irradiating each of these color pixels with a continuous wavelength light containing light components with wavelength λ falling within a range of 380 nm to 780 nm to at an incident angle, and subjecting the transmitted light to measurement using a spectroscopic ellipsometer; and $T(\lambda)_R$, $T(\lambda)_G$, and $T(\lambda)_B$ represent a spectral transmittance of the red pixel, of the green pixel and of the blue pixel, respectively, measured at the wavelength λ falling within a range of 380 nm-780 nm.

$$50 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_G \cdot T(\lambda)_G \cdot S(\lambda) d\lambda - \int_a^b \Delta(\lambda)_B \cdot T(\lambda)_B \cdot S(\lambda) d\lambda| \geq 0 \quad (5)$$

$$25 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_R \cdot T(\lambda)_R \cdot S(\lambda) d\lambda - \int_a^b \Delta(\lambda)_G \cdot T(\lambda)_G \cdot S(\lambda) d\lambda| \geq 0 \quad (6)$$

In equations (5) and (6), $\Delta(\lambda)_R$, $\Delta(\lambda)_G$, and $\Delta(\lambda)_B$ represent an optical retardation of the red pixel, of the green pixel and of the blue pixel, respectively, all of which are obtained by irradiating each of these color pixels with a continuous wavelength light containing a light component with wavelength λ falling within the range of 380 nm to 780 nm at an incident angle, and subjecting the transmitted light to measurement using a spectroscopic ellipsometer; $T(\lambda)_R$, $T(\lambda)_G$, and $T(\lambda)_B$ represent a spectral transmittance of the red pixel, of the green pixel and of the blue pixel, respectively, measured at the wavelength λ falling within the range of 380 nm-780 nm; and S(λ) represents a spectral radiance, at the wavelength λ, of a light source to be used in a liquid crystal display device.

Incidentally, in above-described equations, "a" and "b" are values respectively representing a wavelength range of the continuous wavelength light and satisfying the conditions of: $380 \leq a$, $b \leq 780$ and $a < b$.

Irrespective of the plus or minus sign, the above-described equations (3)-(6) indicate that in a case where the value of $\xi_1$ or $\xi_2$ which is related to the optical retardation of a green pixel is not lower than the value of $\xi_1$ or $\xi_2$ which is related to the optical retardation of a red pixel, the value of $\xi_1$ or $\xi_2$ which is related to the optical retardation of a blue pixel becomes not lower than the value of $\xi_1$ or $\xi_2$ which is related to the optical retardation of a green pixel. The above-described equations (3)-(6) also indicate that in a case where the value of $\xi_1$ or $\xi_2$ which is related to the optical retardation of a green pixel is not higher than the value of $\xi_1$ or $\xi_2$ which is related to the optical retardation of a red pixel, the value of $\xi_1$ or $\xi_2$ which is related to the optical retardation of a blue pixel becomes not higher than the value of $\xi_1$ or $\xi_2$ which is related to the optical retardation of a green pixel.

The value of $\xi_1$ which is related to the perpendicular optical retardation of each of color pixels can be determined as follows. Namely, the color filter, which is provided with at least three color pixels including a red pixel, a green pixel and a blue color pixel, is irradiated with a continuous wavelength light containing a wavelength falling within the range of 380 nm to 780 nm at an incident angle or at an aimed angle, and the transmitted light is subjected to measurement using a spectroscopic ellipsometer to obtain Δ(λ). The Δ(λ) thus obtained is multiplied by a spectral transmittance T(λ) of the color pixel measured at the wavelength λ and then integrated to determine the value of $\xi_1$.

Further, the value of $\xi_2$ which is related to the perpendicular optical retardation of each of color pixels can be determined as follows. Namely, the color filter, which is provided with at least three color pixels including a red pixel, a green pixel and a blue color pixel, is irradiated with a continuous wavelength light containing wavelengths falling within the range of 380 nm to 780 nm at an incident angle, and the transmitted light is subjected to measurement using a spectroscopic ellipsometer to obtain Δ(λ). The Δ(λ) thus obtained is multiplied by a spectral transmittance T(λ) of the color pixel measured at the wavelength λ and by a spectral radiance S(λ) obtained with the wavelength λ of the light source to be used in a liquid crystal display device to thereby obtain a product which is then integrated to determine the value of $\xi_2$.

In this case, when the object to be measured by means of the spectroscopic ellipsometer is a color filter, it is possible to determine the optical retardation Δ(λ) of a single color pixel by carrying out the measurement by making use of a mask which is patterned so as to transmit only a single color pixel selected from R, G and B. If the object to be measured is a single color pixel selected from R, G and B, it is possible to measure the optical retardation without necessitating the employment of the above-described mask. Incidentally, the spectral transmittance T(λ) is a value that satisfies $0 \leq T(\lambda) \leq 1$, and the spectral radiance of a light source can be represented by a value of any optional unit.

When these Δ(λ), T(λ) and S(λ) are given with a non-continuous value corresponding to a wavelength of every 1 nm or every 2 nm for example, the integration of the above-described equations (1)-(6) may be regarded as the sum total of the product of Δ and T at each wavelength, or the sum total of the product of Δ, T and S at each wavelength. Further, with respect to the wavelength of light to be used in the measurement, although it is possible to employ any optional continuous wavelength light containing light components with wavelength λ falling within the range of 380 nm to 780 nm, it is more preferable to employ all of wavelengths including a wavelength of every 5 nm in the range of 400 nm-700 nm, more preferably every 1 nm in the range of 380 nm-780 nm. The reason is that the since influence of interference by the interface between the substrate and the color pixels, which is caused to occur on measuring the optical retardation of the color pixels formed on a substrate, is reflected as an amplitude of a light of wavelength falling within the range of 10 nm to 100 nm, it is more preferable, in order to enhance the accuracy, to determine the $\xi_1$ or $\xi_2$ by making use of the optical retardation Δ(λ) which can be derived at the broadest possible range of wavelength.

Although it is desirable that the absolute value of birefringence index of the color filter is not higher than 0.01, i.e. the value of $\xi_1$ or $\xi_2$ which is related to the perpendicular optical retardation of each of color pixels may desirably be as close to $\xi_1$ (red pixel)=$\xi_1$ (green pixel)=$\xi_1$ (blue pixel)=0 or $\xi_2$ (red pixel)=$\xi_2$ (green pixel)=$\xi_2$ (blue pixel)=0 as possible, it is also possible to obtain an optimum value which is related to the perpendicular optical retardation of each of color pixels under the conditions other than the aforementioned conditions of: $\xi_1$ (red pixel)=$\xi_1$ (green pixel)=$\xi_1$ (blue pixel)=0 or $\xi_2$ (red pixel)=$\xi_2$ (green pixel)=$\xi_2$ (blue pixel)=0 when the color filter is combined with the constituent components other than the color filter, such constituent components including, for example, liquid crystal, a polarizing plate, and the wavelength dispersibility of the optical retardation of an alignment film, etc.

With respect to the optimum value for $\xi_1$ or $\xi_2$ which is related to the optical retardation of each of color pixels in the color filter, it depends on the combination of the color filter with other constituent components. However, what is important is the facts that it is impossible to obtain an excellent oblique visibility of a liquid crystal display device if the value of $\xi_1$ or $\xi_2$, which is related to the optical retardation of a blue pixel, is not larger than the value of $\xi_1$ or $\xi_2$, which is related to the optical retardation of a green pixel, although the value of $\xi_1$ or $\xi_2$, which is related to the optical retardation of a green pixel, is not smaller than the value of $\xi_1$ or $\xi_2$, which is related to the optical retardation of a red pixel, and that it is also impossible to obtain an excellent oblique visibility of a liquid crystal display device if the value of $\xi_1$ or $\xi_2$, which is related to the optical retardation of a blue pixel, is not smaller than the value of $\xi_1$ or $\xi_2$, which is related to the optical retardation of a green pixel, although the value of $\xi_1$ or $\xi_2$, which is related to the optical retardation of a green pixel, is not larger than the value of $\xi_1$ or $\xi_2$, which is related to the optical retardation of a red pixel.

The reason for this can be attributed to the fact that in the case of above-described other constituent components to be employed in a liquid crystal display device, the wavelength dispersion of birefringent is enabled to change continuously depending on the wavelength of the transmitted light.

When the aforementioned equations (3) and (4) are not satisfied, i.e. the following equations (3)' and (4)' are satisfied, it implies a state wherein the difference in the perpendicular optical retardation among the color pixels is too large or a state wherein the perpendicular optical retardation of each of color pixels is not continuously changed depending on the wavelength of transmitted light. As a result, it would become impossible to enable the value of $\xi_1$ or $\xi_2$ to coincide with the wavelength dispersion of other constituent components to be used in a liquid crystal display device, thereby making it impossible to obtain a liquid crystal display device which is excellent in oblique visibility.

$$(\int_a^b \Delta(\lambda)_R \cdot T(\lambda)_R d\lambda - \int_a^b \Delta(\lambda)_B \cdot T(\lambda)_B d\lambda| - |\int_a^b \Delta(\lambda)_G \cdot T(\lambda)_G d\lambda - \int_a^b \Delta(\lambda)_B \cdot T(\lambda)_B d\lambda| > 100 \quad \text{Equation (3)'}$$

or $$0 > |(\int_a^b \Delta(\lambda)_R \cdot T(\lambda)_R d\lambda - \int_a^b \Delta(\lambda)_B \cdot T(\lambda)_B d\lambda| - |\int_a^b \Delta(\lambda)_G \cdot T(\lambda)_G d\lambda - \int_a^b \Delta(\lambda)_B \cdot T(\lambda)_B d\lambda|$$

$$|(\int_a^b \Delta(\lambda)_R \cdot T(\lambda)_R d\lambda - \int_a^b \Delta(\lambda)_B \cdot T(\lambda)_B d\lambda| - |\int_a^b \Delta(\lambda)_R \cdot T(\lambda)_R d\lambda - \int_a^b \Delta(\lambda)_G \cdot T(\lambda)_G d\lambda| > 50 \quad \text{Equation (4)'}$$

or $$0 > |(\int_a^b \Delta(\lambda)_R \cdot T(\lambda)_R d\lambda - \int_a^b \Delta(\lambda)_B \cdot T(\lambda)_B d\lambda| - |\int_a^b \Delta(\lambda)_R \cdot T(\lambda)_R d\lambda - \int_a^b \Delta(\lambda)_G \cdot T(\lambda)_G d\lambda|$$

Likewise, when the aforementioned equations (5) and (6) are not satisfied, i.e. the following equations (5)' and (6)' are satisfied, it implies a state wherein the difference in the perpendicular optical retardation among the color pixels is too large or a state wherein the perpendicular optical retardation of each of color pixels is not continuously changed depending on the wavelength of transmitted light. As a result, it would become impossible to enable the value of $\xi_1$ or $\xi_2$ to coincide with the wavelength dispersion of other constituent components to be used in a liquid crystal display device, thereby making it impossible to obtain a liquid crystal display device which is excellent in oblique visibility.

$$|(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |\int_a^b \Delta(\lambda)_G \cdot T(\lambda)_G \cdot S(\lambda) d\lambda - \int_a^b \Delta(\lambda)_B \cdot T(\lambda)_B \cdot S(\lambda) d\lambda| > 50$$

or $$0 > |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |\int_a^b \Delta(\lambda)_G \cdot T(\lambda)_G \cdot S(\lambda) d\lambda - \int_a^b \Delta(\lambda)_B \cdot T(\lambda)_B \cdot S(\lambda) d\lambda| \quad \text{Equation (5)'}$$

$$|(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |\int_a^b \Delta(\lambda)_R \cdot T(\lambda)_R \cdot S(\lambda) d\lambda - \int_a^b \Delta(\lambda)_G \cdot T(\lambda)_G \cdot S(\lambda) d\lambda| > 25$$

or $$0 > |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |\int_a^b \Delta(\lambda)_R \cdot T(\lambda)_R \cdot S(\lambda) d\lambda - \int_a^b \Delta(\lambda)_G \cdot T(\lambda)_G \cdot S(\lambda) d\lambda| \quad \text{Equation (6)'}$$

As described above, according to one embodiment of the present invention, it is possible to perform the accurate evaluation of a color filter according to the following procedures. Namely, by making use of a spectroscopic ellipsometer or an optical retardation-measuring apparatus, the perpendicular optical retardation of each of at least three color pixels constituting the color filter is determined, and then the optical retardation at each wavelength thus obtained is multiplied by a spectral transmittance, and thus obtained products are subsequently integrated to determine a value related to the perpendicular optical retardation and containing the influence of interference arising from differences of refractive index among the color pixels, an air layer and the substrate. Based on the correlation between the value thus obtained and the oblique visibility on displaying dark-state patterns in the liquid crystal display device, the evaluation of the color filter is performed Further, according to another embodiment of the present invention, since it is possible to prevent the generation of non-uniformity in the polarizing state of the beam passing through the display region of each of color pixels, it is possible to obtain a liquid crystal display device which is excellent in the oblique visibility on displaying dark-state patterns.

Next, each of color pixels will be further explained in detail.

With respect to the red pixel, it is possible to employ red pigments such as C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272, 279, etc.

Incidentally, a yellow pigment may be employed together with an orange pigment. With respect to the yellow pigments, it is possible to employ C.I. Pigment Yellow 1, 2, 3, 4, 5, 6, 10, 12, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 125, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 198, 199, 213, 214, etc. As for the orange pigments, it is possible to employ C.I. Pigment Orange 36, 43, 51, 55, 59, 61, 71, 73, etc.

When the red pixel contains at least one of diketopyrrolopyrrol-based red pigment and anthraquinone-based red pigment out of the aforementioned pigments, it would become easy to obtain a desired value for the $\xi_1$ or $\xi_2$ and hence the employment of these red pigments is preferable. This is because, by suitably controlling the pulverizing treatment of diketopyrrolopyrrol-based red pigment, the $\xi_1$ or $\xi_2$ thereof can be made positive or negative as desired and the absolute value thereof can be controlled more or less, while in the case of the anthraquinone-based red pigment, a value of $\xi_1$ or $\xi_2$ which is close to 0 can be easily obtained irrespective of the pulverizing treatment thereof.

In viewpoints of the hue, lightness, film thickness and contrast of pixel, the red pixel may preferably be formulated to contain 10-90% by weight of diketopyrrolopyrrol-based red pigment and 5-70% by weight of the anthraquinone-based red pigment both based on a total weight of the pigments. When the contrast of pixel is taken into account, the red pixel may preferably be formulated to contain 25-75% by weight of diketopyrrolopyrrol-based red pigment and 25-60% by weight of the anthraquinone-based red pigment both based on a total weight of the pigments.

For the purpose of regulating the hue of a red pixel, the red pixel may contain yellow pigment or orange pigment. However, in viewpoint of enhancing the contrast, it is more preferable to employ azo-metal complex yellow pigments. As for the mixing ratio of the azo-metal complex yellow pigments, it is preferable to confine it to the range of 5-25% by weight based on a total weight of the pigments. If the mixing ratio of the azo-metal complex yellow pigments is less than 5% by weight, it would become impossible to regulate the pixel hue, thus failing to obtain sufficiently increased lightness. If the mixing ratio of the azo-metal complex yellow pigments is larger than 30% by weight, the pixel hue may be excessively shifted to a yellowish color, thus deteriorating the color reproducibility.

As for the diketopyrrolopyrrol-based red pigment, it is preferable to employ C.I. Pigment Red 254, as for the anthraquinone-based red pigment, it is preferable to employ C.I. Pigment Red 177, and as for the azo-metal complex type yellow pigments, it is preferable to employ C.I. Pigment Yellow 150, all in viewpoints of securing excellent light resistance, heat resistance, transparency and tinting strength.

As for the green pixel, it is possible to employ green pigments such as C.I. Pigment Green 7, 10, 36, 37, 58, etc. This green color composition may be employed together with a yellow pigment. As for the yellow pigment, it is possible to employ the same kinds of yellow pigments as described in the aforementioned red pixel.

When the green pixel contains a metallophthalocyanine halide-based green pigment out of the aforementioned pigments, or when the green pixel contains, together with a green pigment, at least one of azo-based yellow pigment and quinophthalone-based yellow pigment, it would become easy to obtain a desired value for the $\xi_1$ or $\xi_2$ and hence the employment of these pigments is preferable. This is because, it is possible, with the employment of the metallophthalocyanine halide-based green pigment, to change the $\xi_1$ or $\xi_2$ to a certain degree by suitably selecting the central metal, while in the case of the azo-based yellow pigment, it is possible to obtain positive $\xi_1$ or $\xi_2$ irrespective of the pulverizing treatment thereof, and in the case of the quinophthalone-based yellow pigment, it is possible to obtain negative $\xi_1$ or $\xi_2$ irrespective of the pulverizing treatment thereof.

In viewpoints of the hue, lightness and film thickness of pixel, the green pixel may preferably be formed of 30-90% by weight of a metallophthalocyanine halide-based green pigment, 10-70% by weight of an azo-based yellow pigment or quinophthalone-based yellow pigment all based on a total weight of the pigments. It is more preferable to confine the content of metallophthalocyanine halide-based green pigment to 50-85% by weight, the content of azo-based yellow pigment to 5-45% by weight, and the content of quinophthalone-based yellow pigment to 5-45% by weight all based on a total weight of the pigments.

As for the metallophthalocyanine halide-based green pigment, it is preferable to employ C.I. Pigment Green 7, 36, as for the azo-based yellow pigment, it is preferable to employ C.I. Pigment Yellow 150, and as for the quinophthalone-based yellow pigment, it is preferable to employ C.I. Pigment Yellow 138, all in viewpoints of securing excellent light resistance, heat resistance, transparency and tinting strength.

As for the metallophthalocyanine halide-based green pigment, the pigment where the central metal is constituted by zinc is preferably employed, since it is possible to obtain positive $\xi_1$ or $\xi_2$ irrespective of the pulverizing treatment thereof and to secure excellent light resistance, heat resistance, transparency and tinting strength.

As for the blue pixel, it is possible to employ blue pigments such as C.I. Pigment Blue 15, 15:1, 15:2, 15:3, 15:4, 15:6, 16, 22, 60, 64, etc. Further, these blue pigments may be used together with a violet pigment, specific examples of the violet pigment including C.I. Pigment Violet 1, 19, 23, 27, 29, 30, 32, 37, 40, 42, 50, etc.

When the blue pixel contains at least one of metallophthalocyanine-based blue pigment and dioxazine-based violet pigment out of the aforementioned pigments, it is possible to easily obtain a value of $\xi_1$ or $\xi_2$ which is close to 0.

In viewpoints of the hue, lightness and film thickness of pixel, the blue pixel may preferably be composed of 40-100% by weight of a metallophthalocyanine-based blue pigment and 0-50% by weight of the dioxazine-based violet pigment all based on a total weight of the pigments. More preferably, the blue pixel may contain 50-98% by weight of a metallophthalocyanine-based blue pigment and 2-25% by weight of the dioxazine-based violet pigment based on a total weight of the pigments.

In viewpoints of the light resistance, heat resistance, transparence and tinting strength of the pixel, it is preferable to employ C.I. Pigment Blue 15:6 as the metallophthalocyanine-based blue pigment and C.I. Pigment Violet 23 as the dioxazine-based violet pigment.

Each of the color pixels may contain an inorganic pigment. Specific examples of the inorganic pigment include metal oxide powder, metal sulfide powder, metal powder, such as yellow lead, zinc chrome, red iron oxide (III), cadmium red, ultramarine blue, Prussian blue, chromium oxide green, cobalt green, etc. Further, in order to secure excellent coating properties, sensitivity, developing properties while making it possible to retain the balance between the chroma and lightness, these inorganic pigments may be used in combination with organic pigments.

For the purpose of toning, each of the color pixels may further contain dyes within the limits which do not deteriorate the heat resistance of the pixels.

In order to realize enhanced brightness and enhanced contrast of the color filter, the pigments to be contained in each of the colored pixels may preferably be selected from those which have undergone a pulverization treatment or those whose average primary particle diameter is relatively small. The average primary particle diameter of a pigment can be calculated by taking a picture of the pigment by making use of a transmission electron microscope and by performing image analysis of the picture.

The average primary particle diameter of a pigment may preferably be confined to not larger than 40 nm, more preferably not larger than 30 nm, most preferably not larger than 20 nm. Further, the average primary particle diameter of a pigment may preferably be not smaller than 5 nm. If the average primary particle diameter of a pigment is larger than 40 nm, the visibility of a liquid crystal display device on displaying a black color may be deteriorated. On the other hand, if the primary particle diameter of a pigment is smaller than 5 nm, it may become difficult to realize satisfactory pigment dispersion, thereby making it difficult to keep the stability of the color composition and to secure the fluidity of the color composition. As a result, non-uniformity of coating may be caused to generate and hence the luminance and color characteristics of a color filter may be deteriorated.

The contrast C(C=Lp/Lc) can be calculated by a method wherein each of colored pixels formed on a transparent substrate is sandwiched between two polarizing plates and a back light is applied from one of the polarizing plates and allowed the light to pass through the other of the polarizing plates and the luminance of light passing through the other polarizing plate is measured by means of a luminance meter, thereby measuring the luminance of light under a condition wherein these polarizing plates are disposed parallel with each other in the polarizing axis to determine the luminance of light (Lp) and also measuring the luminance of light under a condition wherein these polarizing plates are disposed so as to intersect orthogonally with each other in the polarizing axis to determine the luminance of light (Lc). Thereafter, the ratio between (Lp) and (Lc) is calculated to determine the contrast C(C=Lp/Lc). When the contrast that can be obtained using as an object simply a substrate having no colored pixel is represented by CS, the contrast of the red color filter is represented by CR, the contrast of the green color filter is represented by CG, and the contrast of the blue color filter is represented by CB, it is possible to obtain excellent front visibility on displaying dark-state patterns in the liquid crystal display device if these CR, CG and CB satisfy the following conditions. Namely, it is possible to reproduce a crisp dark-state display without accompanying leakage of light.

$$CR/CS > 0.5$$

$$CG/CS > 0.5$$

$$CB/CS > 0.4$$

When the above-described conditions are not satisfied, i.e. when $CR/CS \leqq 0.5$, $CG/CS \leqq 0.5$ or $CB/CS \leqq 0.4$, the leakage of light would become prominent on displaying dark-state patterns, thus making it difficult to obtain a liquid crystal display device which has excellent visibility in normal (perpendicular) direction.

As for the means for controlling the average primary particle diameter of a pigment and also controlling the perpendicular optical retardation, it is possible to employ a method wherein a pigment is mechanically pulverized, thereby controlling the diameter and shape of a primary particle (so-called attrition method); a method wherein a solution of a pigment dissolved in a good solvent is introduced into a poor solvent, thereby precipitating a pigment having a desired primary particle diameter and a desired particle shape (so-called precipitation method); and a method wherein a pigment having a desired primary particle diameter and a desired particle shape is manufactured on synthesizing the pigment (so-called synthetic precipitation method). Depending on the synthesizing method and chemical characteristics of a pigment to be employed, any suitable method may be optionally selected for each pigment.

Following are explanations about the aforementioned methods. As for the specific method to be adopted for controlling the primary particle diameter and particle shape of a pigment contained in the colored pixels constituting the color filter of the present invention, any of the aforementioned methods may be suitably selected.

The attrition method is a method wherein a pigment is mechanically kneaded together with a grinding agent such as a water-soluble inorganic salt such as common salt and with a water-soluble organic solvent which does not dissolve the grinding agent by making use of a ball mill, a sand mill or a kneader (hereinafter referred to as salt milling), after which the inorganic salt and the organic solvent are removed by water washing and dried to obtain a pigment having a desired primary particle diameter and a desired particle configuration. However, since there is a possibility that crystal growth is caused to occur in the pigment due to a salt milling treatment, it would be effective to incorporate a solid resin which can be partially dissolved by the aforementioned organic solvent and a pigment-dispersing agent on the occasion of a salt milling treatment to thereby prevent the crystal growth.

With respect to the mixing ratio between the pigment and the inorganic salt, when the ratio of the inorganic salt becomes larger, the fining efficiency of the pigment can be enhanced but the pigment throughput is caused to decrease, thereby deteriorating the productivity. Because of this, it is generally preferable to confine the content of the inorganic salt to 1-30 parts by weight, more preferably 2-20 parts by weight per one part by weight of the pigment. On the other hand, the water-soluble organic solvent is employed herein so as to make the pigment and the inorganic salt into a uniform agglomerate, so that the water-soluble organic solvent can be employed at a content of 0.5-30 parts by weight per one part by weight of the pigment, though it may depend on the mixing ratio between the pigment and the inorganic salt.

More specifically, the attrition method is performed as follows. Namely, a small amount of a water-soluble organic solvent is added as a wetting agent to a mixture of a pigment and a water-soluble inorganic salt and then vigorously kneaded by making use of a kneader, etc. The resultant mixture is then introduced into water and stirred by making use of a high-speed mixer to obtain a slurry. This slurry is then subjected to filtration, water washing and drying to obtain a granular pigment having a desired primary particle diameter and configuration.

The precipitating method is a method wherein a pigment is dissolved in a suitable kind of good solvent and then mixed with a poor solvent, thereby precipitating pigments having a desired primary particle diameter and a desired particle configuration. According to this precipitating method, it is possible to control the size of a primary particle diameter and the particle configuration by suitably selecting the kind and quantity of these solvents, the precipitation temperature, the precipitating rate, etc. Since a pigment cannot be easily dissolved in a solvent in general, the solvent that can be employed is limited. Specific examples of known solvents that can be employed herein are, for example, strongly acidic solvents such as concentrated sulfuric acid, polyphosphoric acid, chlorosulfonic acid; and basic solvents such as liquid ammonia, a dimethyl formamide solution of sodium methylate, etc.

As a typical example of this precipitating method, there is known an acid pasting method wherein a pigment is dissolved in an acidic solvent to obtain a solution, which is then introduced into another solvent to thereby re-precipitate fine particles of the pigment. In this case, in viewpoint of manufacturing cost, a method of pouring a sulfuric acid solution into water is generally employed in the industry. Although there are no particular limitations with respect to the concentration of the sulfuric acid, it is generally preferable to confine it to the range of 95 to 100% by weight. Although there are no particular limitations with respect to the amount of the sulfuric acid to the pigment, if the amount of the sulfuric acid is too small, the viscosity of the resultant solution would become too high, thus making it difficult to easily handle the solution. On the contrary, if the amount of the sulfuric acid is too large, the treatment efficiency of the pigment would be deteriorated. Therefore, the amount of the sulfuric acid to the pigment may preferably be confined to the range of 3-10 times (weight) the weight of the pigment. Incidentally, the pigment is not necessarily required to be completely dissolved in a solvent. The temperature on the occasion of dissolution may preferably be confined to the range of 0-50° C. If the temperature on the occasion of dissolution is lower than 0° C., the sulfuric acid may be frozen and, additionally, the solubility of the pigment would be decreased. On the other hand, if the temperature on the occasion of dissolution is too high, a side reaction may more likely be caused to occur. The temperature of the water to be poured may preferably be confined to the range of 1-60° C. If the temperature of the water is higher than 60° C., the water may boil due to the heat of dissolution on the occasion of pouring the water to the sulfuric acid, thus making the work very dangerous. On the other hand, if the temperature of the water is lower than 1° C., the water may freeze. The time for the pouring of the water may preferably be confined to 0.1 to 30 minutes based on one weight part of the pigment. As the pouring time is prolonged, the primary particle diameter tends to become larger.

The control of the primary particle diameter and the particle configuration of a pigment may be performed by a combination of a precipitating method such as an acid pasting method and an attrition method such as a salt milling method, while taking the degree of grinding into consideration. This combination method is also preferable in the respect that it can be performed while securing the fluidity of the dispersed body created therein.

In order to prevent the flocculation of the pigment in the course of controlling the primary particle diameter and the particle configuration of a pigment during the salt milling or the acid pasting, a dispersing agent such as a coloring material derivative, a resin type pigment dispersing agent, or a surfactant as shown below can be additionally employed. Further, when the controlling of the primary particle diameter and the particle configuration of a pigment is performed in the presence of two or more kinds of pigments, it would become possible to obtain a stable dispersed body of pigments even if the pigments are inherently difficult to disperse if they are treated individually.

There is known a leuco method as a special precipitation method. When a vat dye type pigment such as a flavanthrone pigment, perinone pigment, perylene pigment, indanthrone pigment, etc. is reduced by making use of alkaline hydrosulfite, the quinine group thereof is turned into the sodium salt of hydroquinone (leuco compound), thus making it water-soluble. When a suitable oxidizing agent is added to this aqueous solution to oxidize the pigment, a pigment which is insoluble in water and small in primary particle diameter can be precipitated.

The synthesizing precipitation method is a method for precipitating a pigment having a desired primary particle diameter and a desired particle configuration concurrent with the synthesis of the pigment. Since filtration, which is a typical separation method, is difficult to employ unless pigment particles are flocculated into larger secondary particles on taking up the finely divided pigment products from a solvent, this synthesizing precipitation method is generally applied to a pigment such as azo type pigments that can be synthesized in an aqueous system where secondary flocculation can easily take place.

Further, with respect to the means for controlling the primary particle diameter and the particle configuration of the pigments, it is also possible to employ a method wherein a pigment is dispersed over a long period of time by making use of a high-speed sand mill (so-called dry milling method for dry-milling a pigment), thereby making it possible to minimize the primary particle diameter of a pigment and concurrently achieving the dispersion of a pigment.

Following is an explanation with respect to the coloring composition to be employed for forming each of the colored pixels of a color filter according to the present invention.

The coloring composition comprises a pigment and a pigment carrier. The pigment carrier to be contained in the color composition to be employed for forming the color pixels of a color filter is employed for dispersing the pigment, and is constituted by a transparent resin, precursors thereof or a mixture thereof.

The transparent resin to be employed herein may preferably have a permeability of not less than 80%, more preferably not less than 95% in a total wavelength range of 400-700 nm of the visible light zone. As for specific examples of the transparent resin, it is possible to employ thermoplastic resin, thermosetting resin and photosensitive resin. The precursor may be a monomer or an oligomer which is capable of creating a transparent resin through the curing thereof by the irradiation of radiation. The resins and precursor can be employed singly or in combination of two or more kinds thereof.

The pigment carrier can be employed at a ratio ranging from 30 to 700 parts by weight, more preferably 60 to 450 parts by weight based on 100 parts by weight of the pigments in the color composition. In a case where a mixture of a transparent resin and the precursor thereof are to be employed as a pigment carrier, the transparent resin can be employed at a ratio ranging from 20 to 400 parts by weight, more preferably 50 to 250 parts by weight based on 100 parts by weight of the pigments in the color composition.

Further, the precursor of the transparent resin can be employed at a ratio ranging from 10 to 300 parts by weight, more preferably 10 to 200 parts by weight based on 100 parts by weight of the pigments in the color composition.

As for the thermoplastic resin, it is possible to employ, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber type resin, cyclized rubber-based resin, celluloses, polybutadien, polyethylene, polypropylene, polyimide, etc.

As for the thermosetting resin, it is possible to employ, for example, epoxy resin, benzoguanamine resin, rosin-modified maleic resin, rosin-modified fumaric acid resin, melamine resin, urea resin, phenol resin, etc.

As for the photosensitive resin, it is possible to employ resins having a linear polymer into which a photo-crosslinkable group such as (metha)acryloyl group, styryl group, etc. has been introduced through a reaction between a linear polymer having a reactive substituent group such as hydroxyl group, carboxyl group, amino group, etc., and a (metha) acrylic compound having a reactive substituent group such as isocyanate group, aldehyde group, epoxy group, etc., or cinnamic acid. It is also possible to employ a linear polymer containing an acid anhydride such as styrene-maleic anhydride copolymer or α-olefin-maleic anhydride copolymer and half-esterified with a (metha)acrylic compound having hydroxyl group such as hydroxyalkyl (metha)acrylate.

With respect to specific examples of the monomers and oligomers which are the precursors of the transparent resin, they include various kinds of acrylic esters and methacrylic esters such as 2-hydroxyethyl(metha)acrylate, 2-hydroxypropyl(metha)acrylate, cyclohexyl(metha)acrylate, polyethyleneglycol di(metha)acrylate, pentaerythritol tri(metha)acrylate, trimethylolpropane (metha)acrylate, dipentaerythritol hexa(metha)acrylate, tricyclodecanyl (metha)acrylate, melamine (metha)acrylate, epoxy(metha)acrylate, etc.; (metha)acrylic acid; styrene; vinyl acetate; (metha)acryl amide; N-hydroxymethyl (metha)acryl amide; acrylonitrile; etc. These compounds can be employed either singly or as a mixture of two or more kinds thereof.

If the color composition is desired to be cured through the irradiation of ultraviolet rays, a photo-polymerization initiator may be added to the color composition. Specific examples of the photo-polymerization initiator useful in this case include an acetophenone-based photo-polymerization initiator such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-methyl-1-[4-(methylthio)phenyl]-2-morpholinopropane-1-one, 2-benzyl-2-diamino-1-(4-morpholinophenyl)-butan-1-one; a benzoin-based photo-polymerization initiator such as benzoin, benzoin methyl ether, benzoin ethyl ether, benzoin isopropyl ether, benzyldimethyl ketal, etc.; a benzophenone-based photo-polymerization initiator such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, etc.; a thioxanthone-based photo-polymerization initiator such as thioxanthone, 2-chlorothioxanthone, 2-methylthioxanthone, isopropylthioxanthone, 2,4-diisopropylthioxanthone, etc.; a triazine-based photo-polymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc.; a borate-based photo-polymerization initiator; a carbazole-based photo-polymerization initiator; an imidazole-based photo-polymerization initiator; etc.

These photo-polymerization initiators can be employed at an amount ranging from 5 to 200 parts by weight, more preferably 10 to 150 parts by weight based on 100 parts by weight of the pigments in the color composition.

The aforementioned photo-polymerization initiators can be employed either singly or as a mixture of two or more kinds thereof. However, these photo-polymerization initiators can be employed also in combination with a sensitizer, examples of which including α-acyloxy ester, acylphosphine oxide, methylphenyl glyoxylate, benzyl, 9,10-phenanthrene quinone, camphor quinine, ethylanthraquinone, 4,4'-diethyl isophthalophenone, 3,3',4,4'-tetra(t-butyl peroxycarbonyl) benzophenone, 4,4'-diethyl aminobenzophenone, etc. These sensitizers can be employed at an amount ranging from 0.1 to 60 parts by weight based on 100 parts by weight of the photo-polymerization initiator.

The color composition may further comprise a polyfunctional thiol which is capable of acting as a chain-transfer agent. As for this polyfunctional thiol, it is possible to employ a compound having two or more thiol groups. Specific examples of such a compound include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc. These polyfunctional thiols can be employed singly or in combination of two or more kinds. The mixing ratio of these polyfunctional thiols may preferably be confined within the range of 0.2 to 150 parts by weight, more preferably 0.2 to 100 parts by weight based on 100 parts by weight of the pigments in the color composition.

The color composition may further contain a solvent for enabling the pigments to be sufficiently dispersed in the pigment carrier and for enabling the color composition to be coated on the surface of a transparent substrate such as a glass substrate, thereby making it possible to easily create a layer of a filter segment having a dried film thickness of 0.2-5 μm. Specific examples of such a solvent include, for example, cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n amyl ketone, propyleneglycol monomethyl ether, toluene, methylethyl ketone, ethyl acetate, methanol, ethanol, isopropyl alcohol, butanol, isobutyl ketone, petroleum solvent, etc. These solvents may be employed singly or in combination of two or more kinds.

The amount of these solvents may preferably be confined within the range of 800 to 4000 parts by weight, more preferably 1000 to 2500 parts by weight based on 100 parts by weight of the pigments in the color composition.

The color composition can be manufactured by finely dispersing one or more kinds of pigment, if required, together with the aforementioned photo-polymerization initiator in a pigment carrier and an organic solvent by making use of a triple roll mill, a twin-roll mill, a sand mill, a kneader, an attritor, etc. Further, in the case of a color composition containing two or more kinds of pigment, each of the pigments may be separately finely dispersed in a pigment carrier and an organic solvent to obtain a dispersion, which is then mixed with other dispersion(s) prepared in the same manner as described above.

When pigments are dispersed in a pigment carrier and an organic solvent, a dispersing agent such as a resin type pigment dispersing agent, a surfactant, a coloring material derivative, etc. can be optionally employed. Since this dispersing agent is excellent in enhancing the dispersibility of pigments and in its effects to prevent the re-flocculation of pigments after the dispersion thereof, the employment of a color composition wherein the pigments are dispersed in a pigment carrier and organic solvent by making use of this dispersing agent is advantageous in obtaining a color filter with color pixels excellent in transparency. The amount of the dispersing agent may preferably be confined within the range of 0.1 to 40 parts by weight, more preferably 0.1 to 30 parts by weight based on 100 parts by weight of the pigments in the color composition.

The resin type pigment dispersing agent is a compound having not only a pigment affinity moiety exhibiting pigmentadsorbing properties, but also another moiety exhibiting compatibility to a pigment carrier, thereby enabling the dispersing agent to adsorb onto the pigment and to stabilize the dispersion of the pigment in the pigment carrier. Specific examples of the resin type pigment dispersing agent include polyurethane, polycarboxylate such as polyacrylate, unsaturated polyamide, polycarboxylic acid, (partial) amine polycarboxylate, ammonium polycarboxylate, alkyl amine polycarboxylate, polysiloxane, long chain polyaminoamide phosphate, hydroxyl group-containing polycarboxylate and modified compounds thereof, an oily dispersing agent such as amide formed through a reaction between poly(lower alkyl imine) and polyester having a free carboxyl group, or the salts thereof, (metha)acrylic acid-styrene copolymer, (metha)acrylic acid-(metha)acrylate copolymer, styrene-maleic acid copolymer, polyvinyl alcohol, water-soluble resin or water-soluble macromolecular compound such as poly(vinyl pyrrolidone), polyester compounds, modified polyacrylate compounds, ethylene oxide/propylene oxide adduct, phosphate, etc. These compounds may be employed individually or in combination of two or more kinds.

As for this surfactant, it is possible to employ an anionic surfactant such as polyoxyethylene alkylether sulfate, dodecylbenzene sodium sulfonate, alkali metal salts of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer, polyoxyethylene alkylether phosphate, etc.; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate, polyethyleneglycol monolaurate, etc.; cationic surfactant such as alkyl quaternary ammonium salt and an ethylene oxide adduct thereof, etc.; and an amphoteric surfactant such as alkyl betaine such as betaine alkyldimethyl aminoacetate, alkylimidazoline, etc. These surfactants can be employed singly or in combination of two or more kinds.

The coloring material derivative is a modified organic pigment having a substituent group introduced therein and may preferably be selected from those whose hue is close to the hue of the pigment to be used. However, if the amount of the coloring material derivatives is relatively small, they may be selected from those whose hue differs from the hue of the pigment to be used. The organic pigment herein includes aromatic polycyclic compounds exhibiting a light yellow color such as naphthalene-based compounds, anthraquinone-based compounds which are not called pigments in general. As for specific examples of the coloring material derivatives, it is possible to employ those described in JP-A 63-305173, JP Patent Publication 57-15620, JP Patent Publication 59-40172, JP Patent Publication 63-17102 and JP Patent Publication 5 (1993)-9469. Especially, since coloring material derivatives having a basic group are highly effective in the dispersion of pigment, they can be preferably employed. These coloring material derivatives may be employed singly or in combination of two or more kinds.

The color composition may further contain a storage stabilizing agent for stabilizing the viscosity of the composition with time. Specific examples of the storage stabilizing agent include, for example, quaternary ammonium chlorides such as benzyltrimethyl chloride, diethylhydroxy amine, etc.; organic acids such as lactic acid, oxalic acid, etc. and methyl ethers thereof; t-butyl pyrocatechol; organic phosphine such as tetraethyl phosphine, tetraphenyl phosphine, etc.; phosphite; etc. The storage stabilizing agent can be employed at an amount of 0.1-10 parts by weight based on 100 parts by weight of the pigment in a color composition.

The color composition may further contain an adherence improver such as a silane coupling agent for the purpose of enhancing the adhesion to a substrate. As for specific examples of the silane coupling agent, they include vinyl silanes such as vinyl tris(β-methoxyethoxy) silane, vinylethoxy silane, vinyltrimethoxy silane, etc.; (metha)acrylsilanes such as γ-methacryloxypropyl silane, etc.; epoxy silanes such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane, γ-glycidoxypropyl triethoxy silane, etc.; amino silanes such as N-β(aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane, N-phenyl-γ-aminopropyl triethoxy silane, etc.; and thiosilanes such as γ-mercaptopropyl trimethoxy silane, γ-mercaptopropyl triethoxy silane, etc. These silane coupling agents can be employed at an amount of 0.01-100 parts by weight based on 100 parts by weight of the pigment in a color composition.

The color composition can be formulated as a gravure offset printing ink, a waterless offset printing ink, a silk screen printing ink, or a solvent developing type or alkaline developing type color resist. The color resist is formulated such that a pigment(s) is dispersed in a composition containing a thermoplastic resin, thermosetting resin or photosensitive resin, a monomer, a photo-polymerization initiator and an organic solvent.

The pigment may preferably be incorporated at a ratio of 5-70% by weight based on a total quantity (100% by weight) of solid substance of the color composition. More preferably, the pigment may be incorporated at a ratio of 20-50% by weight, the balance being substantially constituted by a resinous binder that can be provided by a pigment carrier.

The color composition may preferably be formulated such that bulky particles 5 μm or more in size, preferably, bulky particles 1 μm or more in size, more preferably, bulky particles 0.5 μm or more in size as well as dust intermingled therein are completely removed from the composition by making use of any suitable means such as centrifugal separation, a sintered filter, a membrane filter, etc.

The red pixel, the green pixel and the blue pixel of the color filter according to one embodiment of the present invention can be formed on a transparent substrate by means of a printing method or photolithography method using each of the aforementioned color compositions.

As for the transparent substrate, it is possible to employ a glass plate made of a material such as a soda-lime glass, low alkali borosilicate glass, alkaliless amino borosilicate glass, etc; or a resin plate made of a material such as polycarbonate, poly(methyl methacrylate), polyethylene terephthalate, etc. For the purpose of driving the liquid crystal after the fabrication of a liquid crystal panel, a transparent electrode formed of indium oxide, tin oxide, etc. may be formed on the surface of the glass plate or of the resin plate.

Since the patterning of these color segments by means of a printing method can be performed by simply repeating the printing and drying of a color composition that has been prepared as various kinds of printing inks, the printing method is advantageous as a manufacturing method of a color filter in terms of manufacturing cost and mass production.

Further, due to recent developments in printing techniques, it is now possible to perform the printing of a very fine pattern which is excellent in dimensional precision as well as in smoothness. In order to perform the printing, the ink is preferably formulated such that it cannot be dried or solidified on the surface of a printing plate or on the surface of a blanket. Furthermore, it is also important to control the fluidity of ink in a printing machine. Therefore, the viscosity of ink may be adjusted by making use of a dispersant or an extender pigment.

When each of colored pixels is formed by means of photolithography, a color composition which has been formulated as a solvent developing type or alkaline developing type color resist is coated on the surface of transparent substrate by any desired method of coating such as spray coating, spin coating, slit coating, roll coating, etc., thereby forming a layer having a thickness (as dried) of 0.2-10 μm. On drying the coated layer, it may be performed by making use of a vacuum dryer, convection oven, an IR oven, a hot plate, etc. The layer thus dried as required is then subjected to exposure to ultraviolet rays through a mask having a predetermined pattern and disposed in contact with this layer or in non-contact with this layer. Subsequently, the resultant layer is dipped in a solvent or an alkaline developing solution or sprayed with a developing solution by means of a spraying machine, thereby removing the uncured portion to obtain a desired pattern. Thereafter, the same procedures are repeated for other colors, thus manufacturing a color filter. Further, for the purpose of promoting the polymerization of the color resist, heating may be applied to the coated resist. According to this photolithography method, it is possible to manufacture a color filter which is more excellent in precision as compared with that obtained from the aforementioned printing methods.

On performing the development, an aqueous solution such as sodium carbonate, sodium hydroxide, etc. can be employed as an alkaline developing solution. It is also possible on this occasion to employ an organic alkali such as dimethylbenzyl amine, triethanol amine, etc. Further, the developing solution may contain a defoaming agent or a surfactant. As for the method of the developing treatment, it is possible to employ a shower developing method, a spray developing method, a dip developing method, a paddle developing method, etc.

Incidentally, in order to enhance the sensitivity to ultraviolet exposure, a water-soluble or alkali-soluble resin such as, for example, polyvinyl alcohol or a water-soluble acrylic resin may be coated on the color resist film that has been coated and dried in advance, thereby forming a film which is capable of minimizing the effects of oxygen obstructing the polymerization. Thereafter, the color resist film may be subjected to ultraviolet exposure.

The color filter according to the present invention can be manufactured by means of an electrodeposition method, a transferring method, etc. other than the aforementioned methods. The electrodeposition method is a method which is featured in that, by taking advantage of a transparent conductive film formed on the surface of a transparent substrate, each of the color filter segments is electrodeposited on the transparent conductive film through the effects of electrophoresis of colloidal particles, thereby manufacturing the color filter. On the other hand, the transferring method is a method which is featured in that a color filter layer is formed in advance on the surface of a releasable transferring base sheet and then this color filter layer is transferred onto a desired transparent substrate.

Next, a liquid crystal display device which is equipped with the color filter according to one embodiment of the present invention will be explained as follows.

FIG. 2 is a cross-sectional view schematically illustrating the liquid crystal display device which is provided with the color filter according to one embodiment of the present invention. The liquid crystal display device 4 shown in FIG. 2 illustrates a typical example of a TFT drive type liquid crystal display device for use in a notebook-sized personal computer. This liquid crystal display device 4 is provided with a pair of transparent substrates 5 and 6, which are arranged face to face and spaced apart to form a gap which is filled with a liquid crystal (LC). The present invention is applicable to a liquid crystal display device of a type of TN (Twisted Nematic), STN (Super Twisted Nematic), IPS (In-Plane switching), VA (Vertical Alignment), or OCB (Optically Compensated Birefringence), etc., equipped with a polarizing plate and a phase-shifting plate.

On the inner surface of the first transparent substrate 5, there is formed a TFT (thin film transistor) array 7. On this TFT array 7 is deposited a transparent electrode layer 8 formed of ITO for example. On this transparent electrode layer 8 is further provided an alignment layer 9. Further, a polarizer (polarizing plate) 10 is formed on the outer surface of the transparent substrate 5.

On the other hand, on the inner surface of the second transparent substrate 6, there is formed a color filter 11 according to one embodiment of the present invention. The red, green and blue filter segments constituting the color filter 11 are separated from each other by a black matrix (not shown). If required, a transparent protective film (not shown) may be formed so as to cover the color filter 11. Furthermore, a transparent electrode layer 12, formed of ITO (indium-tin oxide) for example, is formed on this protective film. An alignment layer 13 is deposited so as to cover the transparent electrode layer 12. Further, a polarizer 14 is formed on the outer surface of the transparent substrate 6. Further, a back light unit 16 equipped with a triple wavelength type lamp 15 is disposed below the polarizer 10.

According to the liquid crystal display device which is equipped with the color filter of this embodiment, even if the thickness of the color pixels formed on a substrate is as small as 1-3 μm, where the values related to the perpendicular optical retardation of the red, green and blue pixels constituting the color filter are measured by a spectroscopic ellipsometer or an optical retardation-measuring apparatus, with the optical retardation "Δ" containing the influence of interference arising from differences of refractive index among the color pixels, an air layer and the substrate, it is possible to perform accurate evaluation of a color filter on the basis of the correlation between the value thus obtained and the oblique visibility of the liquid crystal display device.

Further, according to this embodiment, when each of the red, green and blue pixels is created by making use of a color composition which is toned with a combination of plural color pigments so as to conform with the backlight or the features of LCD in particular, it is possible to enable the value of $\xi_1$ or $\xi_2$ related to the perpendicular optical retardation of each of color pixels to satisfy the equations (3) and (4) or the equations (5) and (6), thereby making it possible to prevent the generation of a non-uniformity in the polarizing state of the light passing through the display region of each of color pixels. As a result, it is possible to obtain a liquid crystal display device which is excellent in the oblique visibility. More specifically, since it is possible to realize a black color display which is compensated in the visibility of the oblique angle, it is possible to minimize the color shift as it is viewed from an oblique direction and to reduplicate a neutral black color, thus realizing very excellent display characteristics.

EXAMPLES

Although specific examples of the present invention will be explained below, it should not be construed that the present invention is limited to these examples. Further, as the materials to be employed in these examples are very sensitive to light, it is required to prevent the sensitization of the materials by redundant light such as natural light, thus all work may be performed under a yellow or red lamp. Incidentally, "part(s)" in the following examples and comparative examples means "weight part(s)". Further, the symbols of pigments are indicated by a color index number. For example, "PR254" means "C.I. Pigment Red 254", and "PY150" means "C.I. Pigment Yellow 150".

The following Table 1 illustrates the coloring material derivatives employed in the following examples.

TABLE 1

| Pigment derivatives | Chemical structure |
|---|---|
| D-1 | (structure shown) |
| D-2 | (structure shown) |
| D-3 | (structure shown) |
| D-4 | [CuPc]—SO$_2$NH(CH$_2$)$_3$N(C$_2$H$_5$)$_2$ |

CuPc: Copper phthalocyanine residual group a) Manufacture of Finely Divided Pigment:

Finely divided pigments to be used in Examples and Comparative Examples were manufactured according to the following methods. Then, the pigment thus obtained were observed by means of a transmission electron microscope ("JEM-1200EX", Nippon Denshi Co., Ltd.) and the primary particle diameter of a pigment was calculated through the analysis of photographed images. The primary particle diameter referred to herein represents a particle diameter (a diameter of an equivalent circle) which corresponds to such a particle diameter that an integrated quantity in the cumulative curve of number particle size distribution is 50% of the total quantity.

Manufacturing Example 1

100 parts of diketopyrrolopyrrol-based red pigment PR254 (Ciba Specialty Chemicals Co., Ltd. "IRGAPHOR RED B-CF"; R-1), 18 parts of a coloring material derivative (D-1), 1000 parts of pulverized common salt, and 120 parts of diethylene glycol were put into a 1 gallon stainless steel kneader (Inoue Seisakusho Co., Ltd.) and kneaded for 10 hours at a temperature of 60° C.

Then, the resultant mixture was introduced into 2000 parts of hot water and stirred for about one hour by means of a high-speed mixer while heating it at a temperature of about 80° C. to obtain a slurry. This slurry was then repeatedly subjected to filtration and water washing to remove the common salt and the solvent and then dried for 24 hours at a temperature of 80° C. to obtain 115 parts of a salt milling-treated pigment (Red-2). The primary particle diameter of the pigment thus obtained is shown in the following Table 2.

Manufacturing Example 2

100 parts of anthraquinone-based red pigment PR177 (Ciba Specialty Chemicals Co., Ltd. "CROMOPHTAL RED A2B), 8 parts of a coloring material derivative (D-2), 700 parts of pulverized common salt, and 180 parts of diethylene glycol were put into a 1 gallon stainless steel kneader (Inoue Seisakusho Co., Ltd.) and kneaded for 4 hours at a temperature of 70° C. Then, the resultant mixture was introduced into 4000 parts of hot water and stirred for about one hour by means of a high-speed mixer while heating it at a temperature of about 80° C. to obtain a slurry. This slurry was then repeatedly subjected to filtration and water washing to remove common salt and the solvent and dried for 24 hours at a temperature of 80° C. to obtain 102 parts of a salt milling-treated pigment (Red-4). The primary particle diameter of the pigment thus obtained is shown in the following Table 2.

Manufacturing Example 3

170 parts of tert-amyl alcohol was poured into a sulfonation flask in a nitrogen atmosphere and then 11.04 parts of sodium was added to the tert-amyl alcohol to obtain a mixture which was then heated at a temperature of 92-102° C. to melt the sodium. While vigorously stirring the molten sodium, the mixture was kept overnight at a temperature of 100-107° C.

Then, a solution containing 44.2 parts of 4-chlorobenzonitrile and 37.2 parts of diisopropyl succinate which were dissolved in advance at 80° C. in 50 parts of tert-amyl alcohol was slowly added to the aforementioned mixture over two hours at a temperature of 80-98° C. Then, the resultant reaction mixture was further stirred for three hours at 80° C. and concurrently 4.88 parts of diisopropyl succinate was added dropwise to the reaction mixture.

This reaction mixture was cooled to room temperature and then added to a mixture of 270 parts of methanol, 200 parts of water and 48.1 parts of concentrated sulfuric acid at a temperature of 20° C. Then, the resultant mixture was stirred for 6 hours at a temperature of 20° C. The resultant red mixture was subjected to filtration and the residual matter was washed with methanol and water and then allowed dry at 80° C. to obtain 46.7 parts of red pigment (R-5). The primary particle diameter of the pigment thus obtained is shown in the following Table 2.

Manufacturing Example 4

120 parts of copper phthalocyanine halide-based green pigment PG36 (Toyo Ink Manufacturing Co., Ltd. "LIONOL GREEN 6YK"), 1600 parts of pulverized common salt, and 270 parts of diethylene glycol were put into a 1 gallon stainless steel kneader (Inoue Seisakusho Co., Ltd.) and kneaded for 12 hours at a temperature of 70° C. Then, the resultant mixture was introduced into 5000 parts of hot water and stirred for about one hour by means of a high-speed mixer while heating it at a temperature of about 70° C. to obtain a slurry. This slurry was then repeatedly subjected to filtration and water washing to remove common salt and the solvent and then dried for 24 hours at a temperature of 80° C. to obtain 117 parts of a salt milling-treated pigment (G-1). The primary particle diameter of the pigment thus obtained is shown in the following Table 2.

Manufacturing Example 5

46 parts of zinc phthalocyanine was dissolved in a molten salt consisting of 356 parts of aluminum chloride and 6 parts of common salt and heated to a temperature of 200° C. Then, the resultant solution was cooled down to 130° C. and stirred for one hour. Thereafter, the reaction temperature was raised up to 180° C. and bromine was added drop-wise at a rate of 10 parts per hour to this reaction mixture over 10 hours. Then, chlorine was introduced into this reaction mixture at a rate of 0.8 part per hour taking 5 hours. The resultant reaction mixture was gradually poured into 3200 parts of water and then subjected to filtration and water washing to obtain 107.8 parts of crude zinc phthalocyanine halide pigment. An average number of bromine atoms included in one molecule of this crude zinc phthalocyanine halide pigment was 14.1 and an average number of chlorine atoms included in one molecule of this crude zinc phthalocyanine halide pigment was 1.9. Then, 120 parts of this crude zinc phthalocyanine halide pigment, 1600 parts of pulverized common salt, and 270 parts of diethylene glycol were put into a 1 gallon stainless steel kneader (Inoue Seisakusho Co., Ltd.) and kneaded for 12 hours at a temperature of 70° C. Then, the resultant mixture was poured into 5000 parts of hot water and stirred for about one hour by means of a high-speed mixer while heating it at a temperature of about 70° C. to obtain a slurry. This slurry was then repeatedly subjected to filtration and water washing to remove the common salt and the solvent and then dried for 24 hours at a temperature of 80° C. to obtain 117 parts of a salt milling-treated pigment (G-2). The primary particle diameter of the pigment thus obtained is shown in the following Table 2.

Manufacturing Example 6

150 parts of water was poured into a separable flask and then 63 parts of 35% hydrochloric acid was added with stirring to the water to obtain a solution of hydrochloric acid. Then, while taking care of the foaming reaction, 38.7 parts of benzene sulfonyl hydrazide was added to the solution and ice was added to the solution until the temperature of solution was cooled down to 0° C. After this cooling, 19 parts of sodium nitrite was added to the solution and stirred for 30 minutes at a temperature ranging from 0 to 15° C. Subsequently, sulfamic acid was continuously added to the solution until the coloration of potassium iodide-starch paper could not be recognized any longer.

Furthermore, 25.6 parts of barbituric acid was added to the solution and then the temperature of the resultant solution was raised up to 55° C. and then stirred for 2 hours. Additionally, 25.6 parts of barbituric acid was added to the solution and then the temperature of the resultant solution was raised up to 80° C. and sodium hydroxide was continuously added to the solution until the pH thereof became 5. The resultant solution was stirred for 3 hours at a temperature of 80° C. and then the temperature of the solution was allowed drop to 70° C. Then, the solution was subjected to filtration and washing with hot water.

The press cake thus obtained was dissolved in 1200 parts of hot water to obtain a slurry, which was then stirred for two hours at a temperature of 80° C. Subsequently, while keeping this temperature, the slurry was subjected to filtration and to hot water washing by making use of 2000 parts of hot water heated to 80° C. As a result, it was confirmed that benzene sulfonamide was shifted to the filtrate.

The press cake thus obtained was dried at a temperature of 80° C. to obtain 61.0 parts of disodium salt of azobarbituric acid. Then, 200 parts of water was poured into a separable flask and then 8.1 parts of disodium azobarbiturate powder thus obtained was added with stirring to the water and dispersed therein. The solution having disodium azobarbiturate powder homogeneously dispersed therein was heated up to 95° C. and then 5.7 parts of melamine and 1.0 parts of diarylaminomelamine were added to the solution. Furthermore, a green color solution which was obtained by dissolving 6.3 parts of cobalt chloride (II) hexahydrate in 30 parts of water was added drop-wise to the aforementioned solution over 30 minutes.

Upon finishing the addition of the green color solution, the complexation was allowed take place in the solution for 1.5 hours at a temperature of 90° C. Subsequently, the pH of the solution was adjusted to 5.5 and 20.4 parts of emulsified solution composed of 4 parts of xylene, 0.4 part of sodium oleate and 16 parts of water were added to the first-mentioned solution and the resultant solution was stirred for 4 hours under heating. The resultant solution was then cooled down to 70° C. and immediately subjected to filtration and to repeated water washing using hot water heated to 70° C. until the inorganic salts were washed away. Subsequently, the product was subjected to drying and crushing to obtain 14 parts of azo-based yellow pigment (Y-2). The primary particle diameter of the pigment thus obtained is shown in the following Table 2.

Manufacturing Example 7

100 parts of quinophthalone yellow pigment PY138 (BASF Co., Ltd. "PARIOTOL YELLOW K0961HD"), 5 parts of the coloring material derivative (D-5), 750 parts of pulverized common salt, and 180 parts of diethylene glycol were put into a 1 gallon stainless steel kneader (Inoue Seisakusho Co., Ltd.) and kneaded for 6 hours at a temperature of 60° C.

Then, the resultant mixture was introduced into 3000 parts of hot water and stirred for about one hour by means of a high-speed mixer while heating it at a temperature of about 80° C. to obtain a slurry. This slurry was then repeatedly subjected to filtration and water washing to remove common salt and the solvent and dried for 24 hours at a temperature of 80° C. to obtain 100 parts of a salt milling-treated pigment (Y-3). The primary particle diameter of the pigment thus obtained is shown in the following Table 2.

Manufacturing Example 8

100 parts of copper phthalocyanine-based blue pigment PB15:6 (Toyo Ink Manufacturing Co., Ltd. "LIONOL BLUE ES"), 800 parts of pulverized common salt, and 100 parts of diethylene glycol were put into a 1 gallon stainless steel kneader (Inoue Seisakusho Co., Ltd.) and kneaded for 12 hours at a temperature of 70° C. Then, the resultant mixture was introduced into 3000 parts of hot water and stirred for about one hour by means of a high-speed mixer while heating it at a temperature of about 70° C. to obtain a slurry. This slurry was then repeatedly subjected to filtration and water washing to remove common salt and the solvent and dried for 24 hours at a temperature of 80° C. to obtain 98 parts of a salt milling-treated pigment (B-1). The primary particle diameter of the pigment thus obtained is shown in the following Table 2.

Manufacturing Example 9

300 parts of dioxazine-based violet pigment PV23 (Toyo Ink Manufacturing Co., Ltd. "LIONOGEN VIOLET RL") was poured in 3000 parts of 96% sulfuric acid and stirred for about one hour. The resultant mixture was poured in water at 5° C. and stirred for one hour. The resultant mixture was then filtered and washed with hot water until the washed liquid became neutral. Thereafter, the product thus obtained was allowed to dry at a temperature of 70° C. to obtain an acid pasting-treated pigment. 120 parts of this acid pasting-treated pigment, 1600 parts of pulverized common salt, and 100 parts of diethylene glycol were put into a 1 gallon stainless steel kneader (Inoue Seisakusho Co., Ltd.) and kneaded for 18 hours at a temperature of 90° C.

Then, the resultant mixture was introduced into 5000 parts of hot water and stirred for about one hour by means of a high-speed mixer while heating it at a temperature of about 70° C. to obtain a slurry. This slurry was then repeatedly subjected to filtration and water washing to remove common salt and the solvent and dried for 24 hours at a temperature of 80° C. to obtain 118 parts of a salt milling-treated pigment (V-1). The primary particle diameter of the pigment thus obtained is shown in the following Table 2.

Manufacturing Example 10

8 parts of carbon black (CABOT Co., Ltd. "BLACK PEARLS 800") was homogeneously mixed with 24 parts of a solution of acrylic acid and 40 parts of cyclohexanone to obtain a mixture. By means of a sand mill using glass beads 1 mm in diameter, the mixture was dispersed for 5 hours to prepare a carbon black dispersion. The primary particle diameter of the pigment thus obtained is shown in the following Table 2.

TABLE 2

| Colors | Symbols | Average primary particle diameter (nm) |
|---|---|---|
| RED | R-1 | 68.8 |
|  | R-2 | 24.8 |
|  | R-3 | 78.5 |
|  | R-4 | 28.1 |
|  | R-5 | 23.2 |
| GREEN | G-1 | 22.4 |
|  | G-2 | 24.3 |
| YELLOW | Y-1 | 99.5 |
|  | Y-2 | 25.2 |
|  | Y-3 | 31.2 |
| BLUE | B-1 | 28.3 |
| VIOLET | V-1 | 26.4 |
| BLACK | BL-1 | 17.0 |

Y-1: PY150 (Lancces Co., Ltd. "E4GN")

b) Preparation of a Solution of Acrylic Resin:

800 parts of cyclohexanone was put into a reaction vessel and heated at a temperature of 100° C. while introducing nitrogen gas into the reaction vessel and then, while keeping this temperature, a mixture comprising the following monomers and thermal polymerization initiator was added dropwise to the cyclohexanone over one hour, thereby allowing a polymerization reaction to take place.

| | |
|---|---|
| Styrene | 60.0 parts |
| Methacrylic acid | 60.0 parts |
| Methyl methacrylate | 65.0 parts |
| Butyl methacrylate | 65.0 parts |
| Azobis-isobutyronitrile | 10.0 parts |

After finishing the addition of the aforementioned mixture, the reaction of this mixture was further allowed to take place for 3 hours at a temperature of 100° C. Thereafter, a solution consisting of 2.0 parts of azobis-isobutyronitrile which was dissolved in 50 parts of cyclohexanone was added to the reaction mixture and the reaction thereof was continued for one hour at a temperature of 100° C. to obtain a solution of resin. After being cooled down to room temperature, about 2 g of this resin solution was sampled out and thermally dried for 20 minutes at a temperature of 180° C. to measure an amount of nonvolatile substance. A suitable amount of cyclohexanone was added to the resin solution that had been synthesized in advance so as to make the amount of the nonvolatile substance become 20% by weight, thus preparing a solution of acrylic resin.

c) Preparation of Pigment Dispersion:

A mixture having a composition (weight ratio) shown in the following Table 3 was homogeneously stirred and then, dispersed for 5 hours by means of a sand mill using zirconia beads having a diameter of 1 mm, and the resultant product was subjected to filtration through a 5 μm filter to obtain a pigment dispersion of each color.

TABLE 3

| | | Pigment dispersions | | | | | | | | | |
|---|---|---|---|---|---|---|---|---|---|---|---|
| | | RP-1 | RP-2 | RP-3 | RP-4 | GP-1 | GP-2 | GP-3 | GP-4 | GP-5 | BP-1 |
| Pigments | 1st pigment | R-1 | R-2 | R-2 | R-5 | G-1 | G-1 | G-2 | G-2 | G-1 | B-1 |
|  | 2nd pigment | R-3 | R-4 | R-4 | R-4 | Y-1 | Y-2 | Y-2 | Y-3 | Y-2 | V-1 |
|  | 3rd pigment | — | Y-2 | — | Y-2 | — | — | — | — | BL-1 | — |
| Pigment derivatives | | D-1 | D-1 | D-1 | D-1 | D-3 | D-3 | D-3 | D-3 | D-3 | D-4 |
| Composition | 1st pigment | 9.6 | 4.7 | 7.9 | 4.7 | 8.3 | 8.3 | 7.9 | 8.3 | 7.5 | 9.6 |
|  | 2nd pigment | 1.1 | 3.9 | 2.8 | 3.9 | 5.4 | 5.4 | 5.8 | 5.4 | 4.9 | 0.4 |
|  | 3rd pigment | — | 2.1 | — | 2.1 | 0.0 | 0.0 | 0.0 | 0.0 | 1.4 | 0.0 |
|  | Pigment derivatives | 1.3 | 1.3 | 1.3 | 1.3 | 1.8 | 1.8 | 1.8 | 1.8 | 1.8 | 2.0 |
|  | Acrylic resin solution | 40.0 | 40.0 | 40.0 | 40.0 | 36.5 | 36.5 | 36.5 | 36.5 | 36.5 | 40.0 |
|  | Organic solvent | 48.0 | 48.0 | 48.0 | 48.0 | 48.0 | 48.0 | 48.0 | 48.0 | 48.0 | 48.0 |
|  | Total | 100.0 | 100.0 | 100.0 | 100.0 | 100.0 | 100.0 | 100.0 | 100.0 | 100.0 | 100.0 | d) Preparation of Color Composition (Hereinafter Referred to as Color Resist):

A mixture having a composition (weight ratio) shown in the following Table 4 was homogeneously stirred and then, subjected to filtration through a 1 μm filter, and each color resist was obtained.

TABLE 4

| | | Resist | | | | | | | | | | |
|---|---|---|---|---|---|---|---|---|---|---|---|---|
| | | RR-1 | RR-2 | RR-3 | RR-4 | GR-1 | GR-2 | GR-3 | GR-4 | GR-5 | BR-1 |
| | | Pigment dispersions | | | | | | | | | | |
| | | RP-1 | RP-2 | RP-3 | RP-4 | GP-1 | GP-2 | GP-3 | GP-4 | GP-5 | BP-1 |
| Composition | Pigment dispersions | 51.0 | 51.0 | 51.0 | 51.0 | 52.0 | 52.0 | 52.0 | 52.0 | 52.0 | 42.0 |
| | Acrylic resin solution | 1.0 | 1.0 | 1.0 | 1.0 | 0.0 | 0.0 | 0.0 | 0.0 | 0.0 | 10.0 |
| | Monomer | 4.0 | 4.0 | 4.0 | 4.0 | 4.8 | 4.8 | 4.8 | 4.8 | 4.8 | 5.6 |
| | Photopolymerization Initiator | 3.4 | 3.4 | 3.4 | 3.4 | 2.8 | 2.8 | 2.8 | 2.8 | 2.8 | 2.0 |
| | Sensitizing agent | 0.4 | 0.4 | 0.4 | 0.4 | 0.2 | 0.2 | 0.2 | 0.2 | 0.2 | 0.2 |
| | Organic solvent | 40.2 | 40.2 | 40.2 | 40.2 | 40.2 | 40.2 | 40.2 | 40.2 | 40.2 | 40.2 |
| | Total | 100.0 | 100.0 | 100.0 | 100.0 | 100.0 | 100.0 | 100.0 | 100.0 | 100.0 | 100.0 |

Monomer: trimethyrolpropane triacrylate (NK Ester ATMPT; Shin-Nakamura Kagaku Co., Ltd.)

Photopolymerization-initiator: 2-methyl-1-[4-(methylthio)phenyl]-2-morphorinopropane-1-one (Irgar Cure 907; Ciba Speciality Chemicals Co., Ltd.)

Sensitizer: 4,4'-bis(diethylamino)benzophenone (EAB-F; Hodogaya Chemicals Co.)

Organic solvent: cyclohexanone e) Manufacture of the Coated Films of Various Colors:

By means of spin coating, each of color resists shown in above Table 4 was coated on the surface of a glass substrate and then pre-baked for 20 minutes in a clean oven at a temperature of 70° C. Then, after cooling to room temperature, the substrate was exposed to ultraviolet rays emitted from an ultra-high pressure mercury lamp. Thereafter, the resultant substrate was subjected to spray development using an aqueous solution of sodium carbonate heated up to 23° C., after which the resultant substrate was washed with ion-exchange water and air-dried. Subsequently, the resultant substrate was post-baked for 30 minutes in a clean oven at a temperature of 230° C., thereby forming a colored coated film of each of the colors. The film thickness as dried of the coated film was 2.0 μm in every case.

f) Measurements of Chromaticity of Each of Colored Coated Film, Spectral Transmittance, Perpendicular Optical Retardation, and Contrast:

(Chromaticity and Spectral Transmittance)

The chromaticity and the spectral transmittance $T(\lambda)$ in a chromaticity diagram for XYZ color specification system was measured by a spectrophotometer ("OSP-200"; Olympus Co., Ltd.) at intervals in wavelength of 5 nm in the range of 400 nm-700 nm. The chromaticity of each of colored coated films which were manufactured using each of color resists shown in above Table 4 is shown in the following Table 5.

(Value Related to the Perpendicular Optical Retardation)

The values of perpendicular optical retardation were determined as follows. Namely, by spectroscopic ellipsometer (M-220 (trade name); Nippon Bunko Co., Ltd.), the coated film was measured from the direction which was angled by 45° from the normal direction of substrate having a coated film formed thereon at intervals in wavelength of 5 nm in the range of 400 nm to 700 nm to obtain an ellipsoparameter δ.

By using equation: $\Delta = \delta/360 \times \lambda$, the value of optical retardation $\Delta(\lambda)$ was calculated. Then, by using this value and a sum total of $\Delta(\lambda) \times T(\lambda)$ within the range of 400 nm to 700 nm, the value of $\xi_1$ which is related to the perpendicular optical retardation was calculated. Likewise, by using this value and a sum total of $\Delta(\lambda) \times T(\lambda) \times S(\lambda)$, the value of $\xi_2$ which is related to the perpendicular optical retardation was calculated. The $\xi_1$ and $\xi_2$ of each color coat film of each of color resists shown in above Table 4 are shown in the following Table 5.

(Contrast)

A polarizing plate was laminated on the both surfaces of the substrate having coated films formed thereon and then the luminance of light (Lp) under the condition where polarizing axis of these polarizing plates are disposed parallel with each other was compared with the luminance of light (Lc) under the condition where polarizing axis of these polarizing plates are disposed to intersect orthogonally with each other to obtain the ratio of Lp/Lc, thereby calculating the contrast (C: CR, CG, CB). Then, using as a sample, a simple substrate having no colored pixel formed thereon, the contrast (CS) was measured, thereby enabling the ratio of C/CS to be used for the normalization. Incidentally, the luminance was measured by a color luminance meter ("BM-5A"; Topcon Co., Ltd.) under the condition of a 2° viewing angle. As for the polarizing plate, "NPF-SEG1224DU" (Nitto Denko Co., Ltd.) was employed. Table 5 shows the contrast of each of colored coated films which were manufactured from each of color resists shown in above Table 4.

TABLE 5

| | | Resist films | | | | | | | | | |
|---|---|---|---|---|---|---|---|---|---|---|---|
| | | RR-1 | RR-2 | RR-3 | RR-4 | GR-1 | GR-2 | GR-3 | GR-4 | GR-5 | BR-1 |
| CIE chromaticity | x | 0.652 | 0.649 | 0.649 | 0.649 | 0.279 | 0.278 | 0.278 | 0.281 | 0.278 | 0.136 |
| (C light source) | y | 0.330 | 0.329 | 0.328 | 0.329 | 0.601 | 0.598 | 0.600 | 0.600 | 0.598 | 0.103 |
| C/CS | | 0.25 | 0.83 | 0.58 | 1.08 | 0.40 | 0.63 | 0.58 | 0.52 | 0.59 | 0.50 |

TABLE 5-continued

| | Resist films | | | | | | | | | |
|---|---|---|---|---|---|---|---|---|---|---|
| | RR-1 | RR-2 | RR-3 | RR-4 | GR-1 | GR-2 | GR-3 | GR-4 | GR-5 | BR-1 |
| $\xi_1$ | −39 | 50 | 88 | −12 | −25 | −45 | 3 | 11 | −22 | 6 |
| $\xi_2$ | −12 | 18 | 30 | −4 | −11 | −20 | 1 | 6 | −10 | 2 | h) Manufacture of Color Filter:

The color filters were manufactured from a combination of color resists shown in above Table 4 and by the method described below.

Example 1

First of all, by means of spin coating, a red resist (RR-1) was coated on the surface of a glass substrate having a black matrix formed thereon in advance and then pre-baked for 20 minutes in a clean oven at a temperature of 70° C. Then, after cooling to room temperature, the substrate was exposed, through a photomask, to ultraviolet rays emitted from an ultra-high pressure mercury lamp.

Thereafter, the resultant substrate was subjected to spray development using an aqueous solution of sodium carbonate heated up to 23° C., after which the resultant substrate was washed with ion-exchange water and air-dried. Further, the resultant substrate was post-baked for 30 minutes in a clean oven at a temperature of 230° C., thereby forming a red pixel of a stripe configuration on the substrate.

Next, by making use of a green resist (GR-1), the green pixel was coated on the surface of substrate in the same manner as described above and, further, by making use of a blue resist (BR-1), the blue pixel was coated on the surface of substrate in the same manner as described above, thereby obtaining a color filter. The film thickness of each of these colored pixels was 2.0 μm in every case.

Example 2

A color filter was obtained by repeating the same procedures as described in Example 1 except that the green resist was changed to (GR-3) from (GR-1).

Example 3

A color filter was obtained by repeating the same procedures as described in Example 1 except that the red resist was changed to (RR-2) from (RR-1) and the green resist was changed to (GR-4) from (GR-3).

Example 4

A color filter was obtained by repeating the same procedures as described in Example 1 except that the red resist was changed to (RR-3) from (RR-2).

Example 5

A color filter was obtained by repeating the same procedures as described in Example 1 except that the red resist was changed to (RR-4) from (RR-1) and the green resist was changed to (GR-3) from (GR-1).

Example 6

A color filter was obtained by repeating the same procedures as described in Example 1 except that the green resist was changed to (GR-5) from (GR-1).

Comparative Example 1

A color filter was obtained by repeating the same procedures as described in Example 1 except that the green resist was changed to (GR-2) from (GR-1).

Comparative Example 2

A color filter was obtained by repeating the same procedures as described in Comparative Example 1 except that the red resist was changed to (RR-2) from (RR-1).

Comparative Example 3

A color filter was obtained by repeating the same procedures as described in Example 1 except that the red resist was changed to (RR-3) from (RR-1) and the green resist was changed to (GR-3) from (GR-1).

i) Manufacture of a Liquid Crystal Display Device

A transparent ITO electrode layer was formed on the color filter obtained as described above and then a polyimide alignment layer was formed on the ITO electrode layer. Further, a polarizing plate was formed on the opposite surface of the glass substrate. On the other hand, a TFT array and pixel electrodes were formed on one surface of another (second) glass substrate and a polarizing plate was formed on the opposite surface of this glass substrate.

Two glass substrates thus prepared were positioned face to face so as to make the electrode layers thereof face each other. Then, these glass substrates were aligned with each other while securing a predetermined gap between these substrates through spacer beads and then the outer circumference of this composite body of substrates was entirely sealed while leaving an opening for injecting a liquid crystal composition. Thereafter, a liquid crystal composition was injected from the opening into the gap and then the opening was closed. The liquid crystal display device thus manufactured was assembled with a back light unit to obtain a liquid crystal panel.

j) Assessment of Visibility of Liquid Crystal Display Device on Displaying Black (Dark-state) Color The liquid crystal display device manufactured as described above was operated so as to display a black color and the quantity of the light leaked out from the liquid crystal panel (orthogonally permeated light; leaked light) in the normal direction (front) of the liquid crystal panel and in a slanted direction which was inclined by 45° from the normal direction (oblique angle) was visually observed. The ranking of assessment was as follows, the results being illustrated in the following Table 6.

◯: Leakage of light was not observed and it was possible to obtain a neutral black color, indicating very good visibility.

Δ: Leakage of light was observed and although the black color displayed was slightly tinted, it was considered to raise no problem in practical use.

X: Leakage of light was observed prominently and the black color displayed was remarkably tinted. The visibility was bad.

TABLE 6

| | Resists | | | $\xi_1$ | | | $\xi_2$ | | | Equation (3) | | Equation (4) | | Equation (5) | | Equation (6) | | Visibility of liquid crystal in dark state | |
|---|---|---|---|---|---|---|---|---|---|---|---|---|---|---|---|---|---|---|---|
| | Red | Green | Blue | R | G | B | R | G | B | | | | | | | | | Front | Oblique |
| Ex. 1 | RR-1 | GR-1 | BR-1 | −39 | −25 | 6 | −12 | −11 | 2 | 14 | ○ | 31 | ○ | 1 | ○ | 13 | ○ | X | ○ |
| Ex. 2 | RR-1 | GR-3 | BR-1 | −39 | 3 | 6 | −12 | 1 | 2 | 42 | ○ | 3 | ○ | 13 | ○ | 1 | ○ | Δ | ○ |
| Ex. 3 | RR-2 | GR-4 | BR-1 | 50 | 11 | 6 | 18 | 6 | 2 | 39 | ○ | 5 | ○ | 12 | ○ | 4 | ○ | ○ | ○ |
| Ex. 4 | RR-3 | GR-4 | BR-1 | 88 | 11 | 6 | 30 | 6 | 2 | 77 | ○ | 5 | ○ | 24 | ○ | 4 | ○ | ○ | ○ |
| Ex. 5 | RR-4 | GR-3 | BR-1 | −12 | 3 | 6 | −4 | 1 | 2 | 15 | ○ | 3 | ○ | 5 | ○ | 1 | ○ | ○ | ○ |
| Ex. 6 | RR-1 | GR-5 | BR-1 | −39 | −22 | 6 | −12 | −10 | 2 | 17 | ○ | 28 | ○ | 2 | ○ | 12 | ○ | Δ | ○ |
| Comp. Ex. 1 | RR-1 | GR-2 | BR-1 | −39 | −45 | 6 | −12 | −20 | 2 | −6 | X | 39 | ○ | −8 | X | 6 | ○ | Δ | X |
| Comp. Ex. 2 | RR-2 | GR-2 | BR-1 | 50 | −45 | 6 | 18 | −20 | 2 | −7 | X | −51 | X | −6 | X | −22 | X | ○ | X |
| Comp. Ex. 3 | RR-3 | GR-3 | BR-1 | 88 | 3 | 6 | 30 | 1 | 2 | 79 | ○ | −3 | X | 27 | ○ | −1 | X | Δ | X |

As will be clearly recognized from above Table 6, in the cases of the liquid crystal display devices wherein the color filters obtained in Examples 1 through 6 were employed, since the value of $\xi_1$ or $\xi_2$ related to the perpendicular optical retardation was enabled to satisfy both of the equations (3) and (4), or both of the equations (5) and (6), the oblique visibility thereof was found to be excellent. Further, in the cases of the liquid crystal display devices wherein the color filters obtained in Examples 3-5 were employed, since they satisfy all of the conditions: CR/CS>0.5, CG/CS>0.5, CB/CS>0.4, the visibility from the normal direction was found to be excellent.

Whereas, in the cases of the liquid crystal display devices wherein the color filters obtained in Comparative Examples 1-3 were employed, since they satisfy either one of the equations (3) and (4), or either one of the equations (5) and (6), the balance of perpendicular optical retardation among the red pixel, the green pixel and the blue pixel was found poor, thereby generating color shift in the oblique direction and hence giving poor visibility.

Incidentally, the color filter obtained in Example 6 differs from the color filter obtained in Comparative Example 1 in the respect that while GR-5 resist was employed as a green pixel in the color filter obtained in Example 6, GR-2 resist was employed as a green pixel in the color filter obtained in Comparative Example 1. This GR-5 resist was formulated so as to contain a carbon black dispersion in the GR-2 resist, thereby intentionally lowering the lightness. As a result, it is possible to perform the comparison through an increased change of transmittance without changing the perpendicular optical retardation to be brought about by a green pigment.

Namely, although it is impossible to make clear the tendency of oblique visibility solely on the basis of the perpendicular optical retardation which is generally required, it becomes possible, through the employment of the indication of $\xi_1$ or $\xi_2$ which takes the transmittance into account, to optimally express the correlation between these parameters and the oblique visibility, thereby making it possible to conveniently and accurately evaluate color filters.

What is claimed is:

1. A method of evaluating a color filter comprising a substrate, and at least three color pixels disposed thereon, the method comprising:

determining an oblique visibility of a liquid crystal display device equipped with the color filter on the basis of value $\xi_1$ obtained from equation (1):

$$\xi_1 = \int_a^b \Delta(\lambda) \cdot T(\lambda) d\lambda \tag{1}$$

wherein "a" and "b" are values respectively representing a wavelength range of a continuous wavelength light and satisfying conditions of: 380≦a, b≦780 and a<b; Δ(λ) represents an optical retardation obtained by irradiating each of the color pixels with a continuous wavelength light containing light components with wavelength λ falling within a range of 380 nm to 780 nm to at an incident angle, and subjecting the transmitted light to measurement using a spectroscopic ellipsometer; and T(λ) represents a spectral transmittance of the color pixels measured at the wavelength λ falling within a range of 380 nm-780 nm.

2. The method according to claim 1, wherein the oblique visibility of the liquid crystal display device is determined by judging if following equations (3) and (4) are satisfied:

$$100 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_G \cdot T(\lambda)_G d\lambda - \int_a^b \Delta(\lambda)_B \cdot T(\lambda)_B d\lambda| \geq 0 \tag{3}$$

$$50 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_R \cdot T(\lambda)_R d\lambda - \int_a^b \Delta(\lambda)_G \cdot T(\lambda)_G d\lambda| \geq 0 \tag{4}$$

wherein "a" and "b" are values respectively representing a wavelength range of a continuous wavelength light and satisfying conditions of: 380≦a, b≦780 and a<b; Δ(λ)$_R$, Δ(λ)$_G$ and Δ(λ)$_B$ represent optical retardations of a red pixel, green pixel and blue pixel, respectively, which are obtained by irradiating each of the color pixels with a continuous wavelength light containing light components with wavelength λ falling within a range of 380 nm to 780 nm at an incident angle, and subjecting the transmitted light to measurement using a spectroscopic ellipsometer; and T(λ)$_R$, T(λ)$_G$ and T(λ)$_B$ represent a spectral transmittances of the red pixel, green pixel and blue pixel, respectively, which are measured at the wavelength λ falling within a range of 380 nm-780 nm.

3. A method of evaluating a color filter comprising a substrate, and at least three color pixels disposed thereon, the method comprising:

determining an oblique visibility of a liquid crystal display device equipped with the color filter on the basis of value $\xi_2$ obtained from equation (2):

$$\xi_2 = \int_a^b \Delta(\lambda) \cdot T(\lambda) \cdot S(\lambda) d\lambda \quad (2)$$

wherein "a" and "b" are values respectively representing a wavelength range of a continuous wavelength light and satisfying conditions of: $380 \leq a$, $b \leq 780$ and $a<b$; $\Delta(\lambda)$ represents an optical retardation obtained by irradiating each of the color pixels with a continuous wavelength light containing light components with wavelength $\lambda$ falling within a range of 380 nm to 780 nm at an optional angle, and subjecting the transmitted light to measurement using a spectroscopic ellipsometer; $T(\lambda)$ represents a spectral transmittance of the color pixels measured at the wavelength $\lambda$ falling within the range of 380 nm-780 nm; and $S(\lambda)$ represents a spectral radiance, at the wavelength $\lambda$, of a light source of the liquid crystal display device.

4. The method according to claim 3, wherein the oblique visibility of the liquid crystal display device is determined by judging if following equations (5) and (6) are satisfied:

$$50 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_G \cdot T(\lambda)_G \cdot S(\lambda) d\lambda - \int_a^b \Delta(\lambda)_B \cdot T(\lambda)_B \cdot S(\lambda) d\lambda| \geq 0 \quad (5)$$

$$25 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_R \cdot T(\lambda)_R \cdot S(\lambda) d\lambda - \int_a^b \Delta(\lambda)_G \cdot T(\lambda)_G \cdot S(\lambda) d\lambda| \geq 0 \quad (6)$$

wherein "a" and "b" are values respectively representing a wavelength range of the continuous wavelength light and satisfying the conditions of: $380 \leq a$, $b \leq 780$ and $a<b$; $\Delta(\lambda)_R$, $\Delta(\lambda)_G$ and $\Delta(\lambda)_B$ represent optical retardations of a red pixel, green pixel and blue pixel, respectively, which are obtained by irradiating each of the color pixels with a continuous wavelength light containing light components with wavelength $\lambda$ falling within a range of 380 nm to 780 nm at an incident angle, and subjecting the transmitted light to measurement using a spectroscopic ellipsometer; $T(\lambda)_R$, $T(\lambda)_G$ and $T(\lambda)_B$ represent a spectral transmittances of the red pixel, green pixel and blue pixel, respectively, which are measured at the wavelength $\lambda$ falling within the range of 380 nm-780 nm; and $S(\lambda)$ represents a spectral radiance, at the wavelength $\lambda$, of a light source of the liquid crystal display device.

5. A color filter which comprises a substrate, and at least a red pixel, a green pixel and a blue pixel disposed thereon, and satisfy following equations (3) and (4):

$$100 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_G \cdot T(\lambda)_G d\lambda - \int_a^b \Delta(\lambda)_B \cdot T(\lambda)_B d\lambda| \geq 0 \quad (3)$$

$$50 \geq |(\int_a^b \Delta(\lambda)_R \cdot T(\lambda)_R d\lambda - \int_a^b \Delta(\lambda)_B \cdot T(\lambda)_B d\lambda| - |(\int_a^b \Delta(\lambda)_R \cdot T(\lambda)_R d\lambda - \int_a^b \Delta(\lambda)_G \cdot T(\lambda)_G d\lambda| \geq 0 \quad (4)$$

wherein "a" and "b" are values respectively representing a wavelength range of a continuous wavelength light and satisfying conditions of: $380 \leq a$, $b \leq 780$ and $a<b$; $\Delta(\lambda)_R$, $\Delta(\lambda)_G$ and $\Delta(\lambda)_B$ represent optical retardations of the red pixel, green pixel and blue pixel, respectively, which are obtained by irradiating each of the pixels with a continuous wavelength light containing light components with wavelength $\lambda$ falling within the range of 380 nm to 780 nm at an optional angle, and subjecting the transmitted light to measurement using a spectroscopic ellipsometer; and $T(\lambda)_R$, $T(\lambda)_G$ and $T(\lambda)_B$ represent spectral transmittances of the red pixel, green pixel and blue pixel, respectively, which are measured at the wavelength $\lambda$ falling within the range of 380 nm-780 nm.

6. A color filter which comprises a substrate, and at least a red pixel, a green pixel and a blue pixel disposed thereon, and satisfy following equations (5) and (6):

$$50 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_G \cdot T(\lambda)_G \cdot S(\lambda) d\lambda - \int_a^b \Delta(\lambda)_B \cdot T(\lambda)_B \cdot S(\lambda) d\lambda| \geq 0 \quad (5)$$

$$25 \geq |(\int_a^b \Delta(\lambda)_R \cdot T(\lambda)_R \cdot S(\lambda) d\lambda - \int_a^b \Delta(\lambda)_B \cdot T(\lambda)_B \cdot S(\lambda) d\lambda| - |(\int_a^b \Delta(\lambda)_R \cdot T(\lambda)_R \cdot S(\lambda) d\lambda - \int_a^b \Delta(\lambda)_G \cdot T(\lambda)_G \cdot S(\lambda) d\lambda| \geq 0 \quad (6)$$

wherein "a" and "b" are values respectively representing a wavelength range of a continuous wavelength light and satisfying conditions of: $380 \leq a$, $b \leq 780$ and $a<b$; $\Delta(\lambda)_R$, $\Delta(\lambda)_G$ and $\Delta(\lambda)_B$ represent optical retardations of the red pixel, green pixel and blue pixel, respectively, which are obtained by irradiating each of the pixels with a continuous wavelength light containing light components with wavelength $\lambda$ falling within the range of 380 nm to 780 nm at an optional angle, and subjecting the transmitted light to measurement using a spectroscopic ellipsometer; $T(\lambda)_R$, $T(\lambda)_G$ and $T(\lambda)_B$ represent spectral transmittances of the red pixel, green pixel and blue pixel, respectively, which are measured at the wavelength $\lambda$ falling within a range of 380 nm-780 nm; and $S(\lambda)$ representing a spectral radiance, at the wavelength $\lambda$, of a light source of the liquid crystal display device.

7. The color filter according to claim 5 or 6, wherein the red pixel contains at least one pigment selected from the group consisting of diketopyrrolopyrrol-based red pigment and anthraquinone-based red pigment; the green pixel contains metallophthalocyanine halide-based green pigment, or contains at least one pigment selected from the group consisting of azo-based yellow pigment and quinophthalone-based yellow pigment together with a green pigment; and the blue pixel contains at least one pigment selected from the group consisting of metallophthalocyanine-based blue pigment and dioxazine-based violet pigment.

8. The color filter according to claim 5 or 6, wherein an average primary particle diameter of the pigments contained in the red pixel, green pixel and blue pixel is confined to 5-40 nm.

9. The color filter according to claim 5 or 6, wherein the contrast Lp/Lc satisfies below-described conditions; the contrast Lp/Lc being a ratio between a luminance of light (Lp) determined under a condition wherein polarizing axes of polarizing plates are disposed parallel with each other and a luminance of light (Lc) determined under a condition wherein polarizing axes of the polarizing plates are disposed so as to intersect orthogonally with each other in a state wherein each of colored pixels formed on a transparent substrate is sandwiched between the polarizing plates, a back light is applied to one of the polarizing plates and the luminance of light passing through and exiting from said other polarizing plate is measured by means of a luminance meter:

$$CR/CS > 0.5$$

$$CG/CS > 0.5$$

$$CB/CS > 0.4$$

wherein CS represents a contrast that is obtained using simply a substrate having no colored pixel; CR represents a contrast of the red pixel; CB represents a contrast of the green pixel; and CG represents a contrast of the blue pixel.

10. A liquid crystal display device equipped with the color filter set forth in claim 5 or 6.

* * * * *

UNITED STATES PATENT AND TRADEMARK OFFICE
CERTIFICATE OF CORRECTION

| | |
|---|---|
| PATENT NO. | : 7,948,623 B2 |
| APPLICATION NO. | : 12/457701 |
| DATED | : May 24, 2011 |
| INVENTOR(S) | : Koichi Minato et al. |

It is certified that error appears in the above-identified patent and that said Letters Patent is hereby corrected as shown below:

On the Title Page, Item (73), under Assignees, delete the second assignee, "Tokyo Ink Mfg. Co., Ltd., Tokyo (JP), and insert --Toyo Ink Mfg. Co., Ltd., Tokyo (JP)--.

Signed and Sealed this
Twenty-seventh Day of September, 2011

David J. Kappos
*Director of the United States Patent and Trademark Office*